June 11, 1963 S. A. CHASMAN 3,092,942

APPARATUS FOR ENCAPSULATING

Filed April 15, 1960 29 Sheets-Sheet 1

INVENTOR.
SYDNEY A. CHASMAN

BY Amster & Levy
ATTORNEYS

APPARATUS FOR ENCAPSULATING

INVENTOR.
SYDNEY A. CHASMAN
BY
Amster & Levy
ATTORNEYS

June 11, 1963 S. A. CHASMAN 3,092,942

APPARATUS FOR ENCAPSULATING

Filed April 15, 1960 29 Sheets-Sheet 3

INVENTOR.
SYDNEY A. CHASMAN
BY Amster & Levy
ATTORNEYS

June 11, 1963 S. A. CHASMAN 3,092,942

APPARATUS FOR ENCAPSULATING

Filed April 15, 1960 29 Sheets-Sheet 4

INVENTOR.
SYDNEY A. CHASMAN

BY Amster & Levy
ATTORNEYS

APPARATUS FOR ENCAPSULATING

Filed April 15, 1960 29 Sheets-Sheet 5

INVENTOR.
SYDNEY A. CHASMAN
BY Amster & Levy
ATTORNEYS

June 11, 1963 S. A. CHASMAN 3,092,942

APPARATUS FOR ENCAPSULATING

Filed April 15, 1960 29 Sheets-Sheet 6

INVENTOR.

SYDNEY A. CHASMAN

BY Amster & Levy

ATTORNEYS

INVENTOR.
SYDNEY A. CHASMAN
BY Amster & Levy
ATTORNEYS

INVENTOR.
SYDNEY A. CHASMAN
BY
Amster & Levy
ATTORNEYS.

INVENTOR.
SYDNEY A. CHASMAN
BY Amster & Levy
ATTORNEYS

June 11, 1963 S. A. CHASMAN 3,092,942

APPARATUS FOR ENCAPSULATING

Filed April 15, 1960 29 Sheets-Sheet 10

INVENTOR.
SYDNEY A. CHASMAN

BY Amster & Levy
ATTORNEYS

June 11, 1963 S. A. CHASMAN 3,092,942

APPARATUS FOR ENCAPSULATING

Filed April 15, 1960 29 Sheets-Sheet 11

INVENTOR.
SYDNEY A. CHASMAN
BY Amster & Levy
ATTORNEYS

INVENTOR
SYDNEY A. CHASMAN
BY
Amster & Levy
ATTORNEYS

APPARATUS FOR ENCAPSULATING

Filed April 15, 1960 29 Sheets-Sheet 13

INVENTOR
SYDNEY A. CHASMAN
BY Amster & Levy
ATTORNEYS

June 11, 1963 S. A. CHASMAN 3,092,942

APPARATUS FOR ENCAPSULATING

Filed April 15, 1960 29 Sheets-Sheet 14

INVENTOR
SYDNEY A. CHASMAN
BY *Amster & Levy*
ATTORNEYS

June 11, 1963 S. A. CHASMAN 3,092,942

APPARATUS FOR ENCAPSULATING

Filed April 15, 1960 29 Sheets-Sheet 15

INVENTOR
SYDNEY A. CHASMAN
BY
Amster & Levy
ATTORNEYS

June 11, 1963 S. A. CHASMAN 3,092,942

APPARATUS FOR ENCAPSULATING

Filed April 15, 1960 29 Sheets-Sheet 16

INVENTOR.

SYDNEY A. CHASMAN

BY

Amster & Levy

ATTORNEYS

June 11, 1963 S. A. CHASMAN 3,092,942

APPARATUS FOR ENCAPSULATING

Filed April 15, 1960 29 Sheets-Sheet 17

INVENTOR
SYDNEY A. CHASMAN
BY Amster & Levy
ATTORNEYS

INVENTOR
SYDNEY A. CHASMAN
BY Amster & Levy
ATTORNEYS

INVENTOR
SYDNEY A. CHASMAN
BY Amster & Levy
ATTORNEYS

June 11, 1963 S. A. CHASMAN 3,092,942

APPARATUS FOR ENCAPSULATING

Filed April 15, 1960 29 Sheets-Sheet 20

INVENTOR
SYDNEY A. CHASMAN
BY Amster & Levy
ATTORNEYS

INVENTOR
SYDNEY A. CHASMAN
BY Amster & Levy
ATTORNEYS

INVENTOR
SYDNEY A. CHASMAN
BY Amster & Levy
ATTORNEYS

June 11, 1963 S. A. CHASMAN 3,092,942

APPARATUS FOR ENCAPSULATING

Filed April 15, 1960 29 Sheets-Sheet 23

INVENTOR.
SYDNEY A. CHASMAN
BY Amster & Levy
ATTORNEYS

INVENTOR.
SYDNEY A. CHASMAN
BY
Amster & Levy
ATTORNEYS

INVENTOR.
SYDNEY A. CHASMAN
BY Amster & Levy
ATTORNEYS.

INVENTOR.
SYDNEY A. CHASMAN
BY
Amster & Levy
ATTORNEYS

INVENTOR.
SYDNEY A. CHASMAN
BY
Amster & Levy
ATTORNEYS.

INVENTOR.
SYDNEY A. CHASMAN
BY
Amster & Levy
ATTORNEYS.

June 11, 1963 S. A. CHASMAN 3,092,942

APPARATUS FOR ENCAPSULATING

Filed April 15, 1960 29 Sheets-Sheet 29

INVENTOR.
SYDNEY A. CHASMAN
BY Amster & Levy
ATTORNEYS.

United States Patent Office 3,092,942
Patented June 11, 1963

3,092,942
APPARATUS FOR ENCAPSULATING
Sydney A. Chasman, 1350 Outlook Drive, Mountainside, N.J.
Filed Apr. 15, 1960, Ser. No. 22,520
28 Claims. (Cl. 53—182)

The present invention generally relates to a machine for, and a method of making, fluid filled capsules and more particularly to the production of a capsule from continuous sheets of plastic film and filling the same with a fluid material. The plastic film may be made of a water soluble gelatin or of any other organic plastic material which is capable of being formed into sheet form. The film or sheet thus made can be deformed under certain conditions of heat and pressure into segmental capsule portions which are brought together, held in such position while being filled with a fluid material, then sealed together to form a completely filled capsule and thereafter freed from the surrounding sheet material. While the invention will generally be used in the production of capsules filled with liquid materials, it is contemplated that the invention may also be used with pasty fluids, with semi-fluid materials, or indeed some powdery materials may be used, if they have a low internal friction so that a pressure applied to one portion of the material will produce substantially uniform hydrostatic pressures throughout the body of the material. In other words, the filling material should be a hydraulic fluid or act somewhat as a hydraulic fluid and will usually be referred to hereinafter as a fluid.

Similar machines have therefore been known in the prior art but all of which I am aware have had a number of disadvantages which the present invention is designed to overcome. For example, one type of apparatus heretofore made for this purpose utilized two opposed, continuously rotatable die-rollers each having a multiplicity of successively registering die cavities surrounded by sealing and severing ledges over and between which a pair of gelatin sheet films were fed in juxtaposed face to face relationship.

As the sealing ledges progressively rolled into opposing sealing relationship with one another, isolating the selected portions of the sheet films to form capsules, a fluid filling material was forced under pressure between the juxtaposed gelatin films. Means were provided to contain the pressure of the fluid between the films and the pressure molded the films into the die cavities to form a series of hemispherical shells conforming with the shapes of the die cavities. As the continuous movement of the die rollers progressed, the sealing ledges continued to progressively seal the edges of the hemispherical shells to form a closed capsule around the filling material. Also the pressure of the sealing ledges was designed to cut the filled capsule free from the waste gelatin. This proposal was disadvantageous for several reasons, among which was the fact that it was difficult to adequately contain the fluid pressure between the films at the time the seal was begun and the shell halves inflated. Where a V-shaped sealing block was interposed between the films at the entering side of the die rollers, and drilled with appropriately disposed fluid delivery passages, and the block curved along its side to fit the curvature of the rollers, gelatin tended to be built up on the surfaces of the block along which the films slid. Such deposits built up until they tended to tear the films. The removal of the block for cleaning was a long and tedious operation. Also the seal on the advancing or forward side of each capsule was made when there was little or no fluid pressure between the films and was much wider and firmer than the seal at the final or rear side of each capsule. Frequently, even if the capsule did not leak, and this was not uncommon, the rear seal was much narrower than that at the front side, which resulted in a lop-sided appearance to the capsule. There was often a four to one difference in width between the seals at the front and rear sides of each capsule.

It has also been proposed to preform the halves of the capsules before the hydraulic filling is introduced, either by vacuum or mechanical pressure. This had the disadvantage, among others, that the preformed gelatin films had to be submerged within the body of the filling material if they were to be completely filled with the filling material without air inclusions. Alternatively, a variation of this proposal involved holding a pool of the filling material on a lower of two films running horizontally between a pair of sealing rollers one disposed above the other by means of suitable sealing walls at each end of the space between the sealing rollers. These latter concepts however, required the difficult operation of sealing the edges of the capsule while submerged. In many cases, the filling material tended to prevent a complete seal. Furthermore, where expensive filling materials are involved, or where cleanliness or the prevention of contamination of the product, is imperative these concepts could not satisfactorily be practiced.

Substantial quantities of the filling material were lost between the films in the area outside of the capsules, commonly known as the "net." This was not only wasteful of the filling material but also contaminated the unused gelatin of the "net" so that it could not, as a practical matter, be reclaimed and reused.

Still another arrangement involved the intermittent feeding of the superposed sheets of gelatin between a first and a second pair of juxtaposed reciprocating dies, the first pair of which stamped the sheets into a series of parallel depending tubes, into which the filling material was introduced after the tubes were formed. The second pair of reciprocating dies stamped out completed, filled, capsules from the series of tubes hanging down from the upper, tube-forming dies. Here the "net" contained substantial quantities of the filling material sealed between the sheets. Recovery of the unused gelatin in an uncontaminated state was practically impossible. Furthermore, since the filled tubes, depending from the first, or upper, pair of dies, were in tension, there was a variable amount of stretch in the tubes, depending on the exact temperature of the gelatin, the weight of the filling material, etc., so that variations in the size and filling content of the completed capsules were encountered. Other alternatives, where otherwise satisfactory, usually presented the problem of reliably preventing the inclusion of the air within each filled capsule. Many filling materials are adversely affected by the included air, or at best, a variable amount of air within the capsules caused a variation in the charge of active material within the capsules. It is a primary object of the present invention to overcome such problems and to provide a capsule making machine which will make a plastic capsule of the required dimensions and content and which will fill the same uniformly and completely with an accurately measured charge of the hydraulic fluid.

It is another object of the present invention to provide a method of encapsulating fluid material which will produce capsules of uniform size filled with predetermined and uniform charges.

It is still another object of the present invention to obviate the necessity of immersing a capsule making machine in the hydraulic material which is to be incapsulated.

A further object of the present invention is to assure that the capsules produced will have no air inclusions.

Yet a further object of the present invention is the provision of an encapsulating machine which will be capable of producing completely filled capsules at a high rate of speed, which will require the minimum amount of maintenance and which will be smooth and quiet in operation.

Yet a further object of the present invention is to provide accurately metered charges of fluid into the capsules as they are formed.

An additional object of the present invention is to improve the operation of fluid metering pumps.

Still an additional object is to provide simple reliable fluid pumping apparatus which will reliably deliver accurately predetermined charges of fluid as required.

A further additional object is the provision of a pump as aforesaid which can be adjusted to vary the predetermined charges as may be required without stopping the operation of the pump.

The foregoing objects, and others which may appear from the following detailed description of an embodiment of the present invention are attained by providing a machine capable of preparing two continuous strips of plastic film, such as water soluble gelatin, which are brought into a juxtaposed face to face relationship between a pair of multi-faceted cylinders which are arranged to intermittently rotate or index together. As each intermittent increment of rotation or indexing operation is completed so that flat faces are in opposition, the rotation stops, the cylinders are blocked against further rotation and are moved into abutting relationship, one flat face against the other, with the two films between them. Each multi-faceted cylinder is provided on each of the flat faces with a longitudinal array of apertures into which the film material is to be deformed in order to produce a half capsule. While the pair of superposed films are held in closely abutting relationship by the opposed flat faces of the cylinders they are not sealed together, but the areas within the apertures are captured in a manner that allows additional material to be drawn from the sheets in the forming operation. A pair of opposed hollow punches is provided for each pair of opposed apertures, one within each of the hollow cylinders, and each includes a central plunger. The punches and associated plungers are caused to advance toward each other to press the captured portion of the gelatin sheets together tightly to define a circular area which is to form a capsule. This pressing operation assures that no air is entrapped within the captured areas of the opposed gelatin films. Thereafter the plungers and punches are retracted and a hydraulic supply nozzle or group of nozzles mounted to project between the two gelatin films in the immediate vicinity of the captured portions of the films and then introduce a measured charge of the filling fluid into said circular area. A suitable relief is provided adjacent each aperture in each face of the cylinders to permit the nozzle or group of nozzles to be stationed close enough to said area so that the fluid will penetrate into said space without waste or leakage. The pressure of the hydraulic material between the two films deforms the captured areas of the opposed gelatin films into a generally spherical shape completely filled with the filling material. The hollow reciprocable die punches, mounted with the hollow cylinders, are caused to approach one another and firmly press the gelatin sheets together around the entire periphery of the capsule, substantially freeing the capsule from the remainder of the sheet and sealing the edges all the way around. The cylinders are then caused to retract from one another a slight distance sufficient to provide clearance for the next step-wise movement of the cylinders. Preferably, the retracting of the cylinders is such that the gelatin sheets are under uniform pressure during the entire index cycle, though the radial distance from the center of rotation of each cylinder to the extreme periphery, measured along a line joining the two centers of rotation varies substantially. Thus, reliable feeding of the gelatin sheets is assured throughout the entire index cycle.

At the same time as the indexing operation introduces the next increment of gelatin sheets for capture between the next pair of opposed flat faces of the cylinders, the series of capsules just formed and filled is freed from the sheets and from the flat faces of the cylinders in which they were just formed. A "kicker" or "ejector" plunger individual to each aperture in a face of each cylinder and contained within each of the hollow cylinders is caused to periodically protrude through each of the apertures in one face of the cylinders below those taking part in the operation just explained above in order to free the formed capsule if it should be caught in either of the apertures. The pair of opposed gelatin films then progresses through stripping rollers to assure that if a capsule is not entirely freed from the surrounding sheets of material it will be pulled free and allowed to drop into a receptacle or conveyor arranged for the collection of the completed work pieces and which is preferably filled with refrigerated oil to cool the capsules. The remainder of the sheets pass through final pull-off rollers which deliver them to an appropriate final disposition.

The pump organization includes a number of pistons one for each nozzle or for each nozzle in a group of nozzles, continuously reciprocated within the pump-body in timed relationship with the indexing of the cylinders so as to draw fluid from a supply reservoir and deliver it under pressure to the filling nozzles at appropriate times during the cycle of operation. The delivery is under control of valves releasably driven from the drive train so that when desired the discharge of fluid can be interrupted. The pump pistons, however, continue in operation to continuously agitate the fluid to be inserted in the capsules whereby a homogeneous mixture is assured. In order to insure against unsightly leakage of fluid and possible contamination, valve lock means are provided to positively seal the seats between the valve proper and its associated passageways during the suction and discharge movements of the pump pistons, while at the same time providing for relaxing the sealing pressures during intervals when the valve mechanism is being operated, thus reducing the power required to move the valves.

The present invention will be more fully understood by reference to the following detailed description which is accompanied by a drawing in which.

Figure 1:
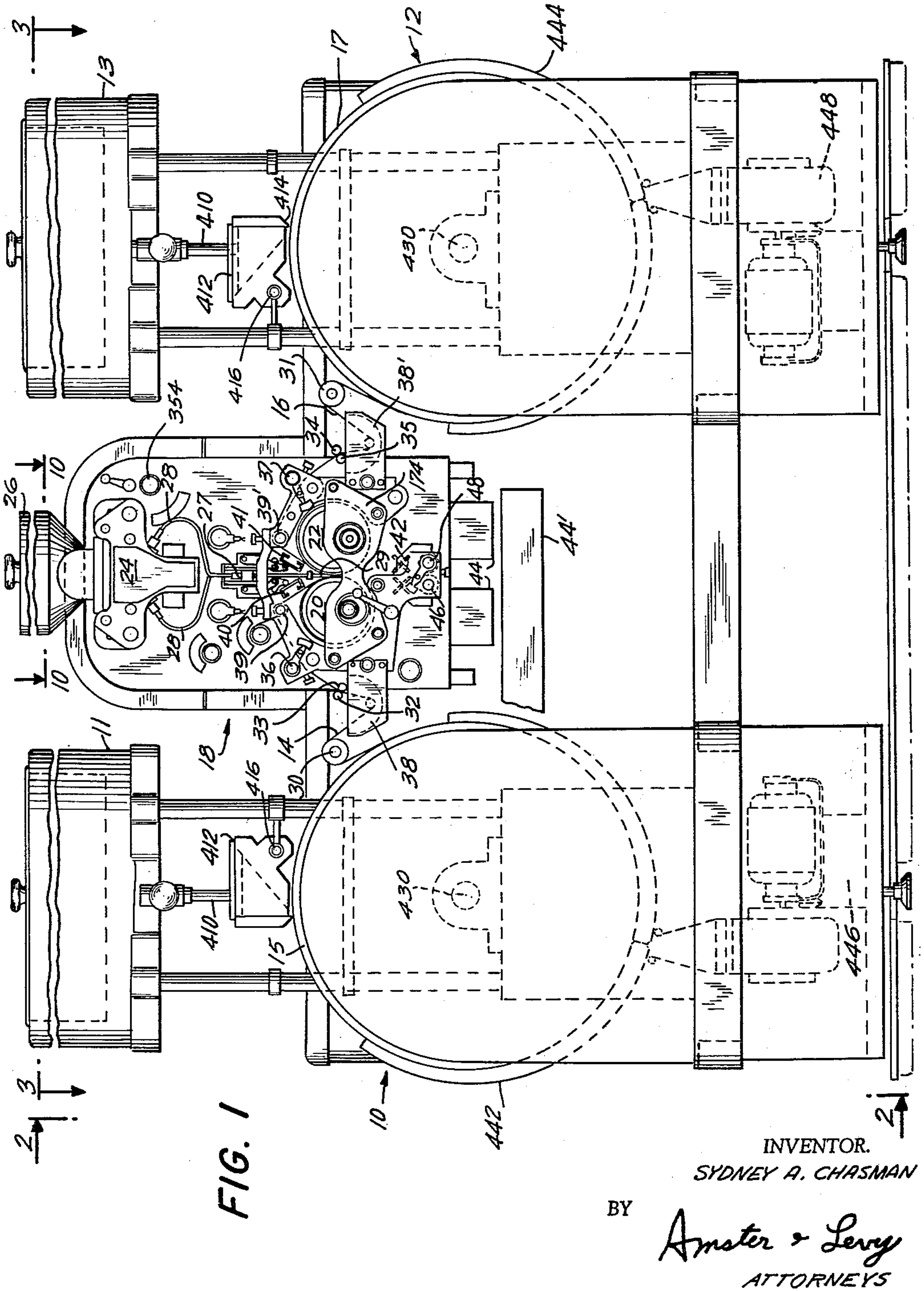
FIG. 1 is a front elevational view of an embodiment of the invention showing the general organization of the machine.
Figure 2:
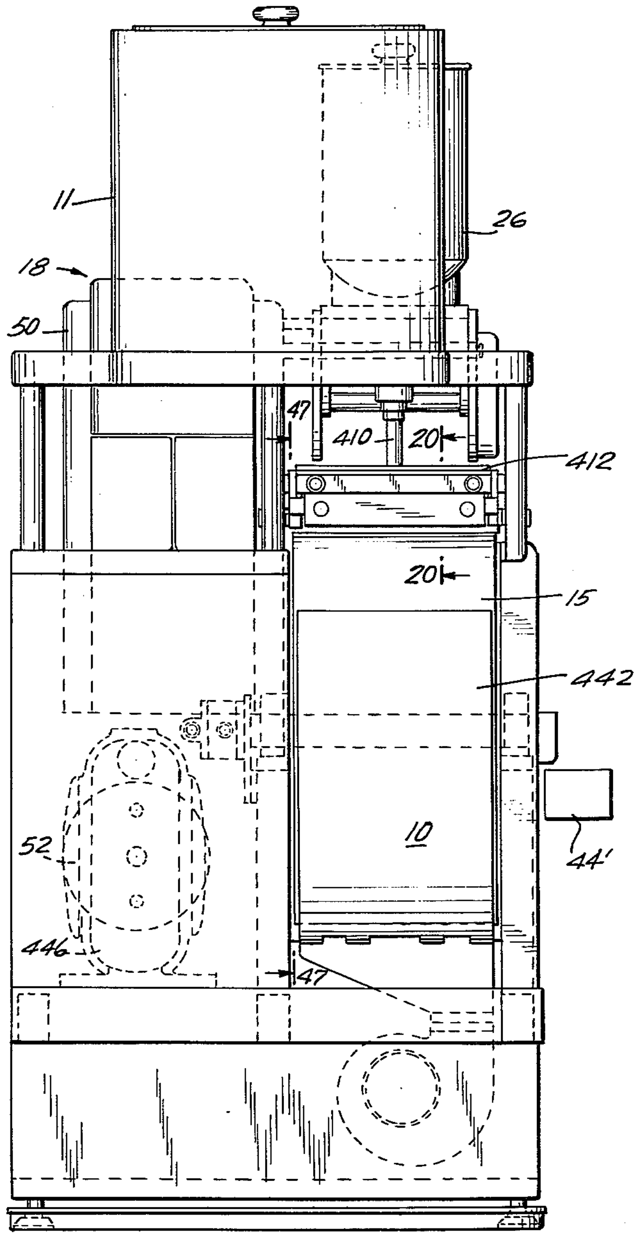
FIG. 2 is a side elevational view of the embodiment of FIG. 1 taken along line 2—2 of FIG. 1.
Figure 3:
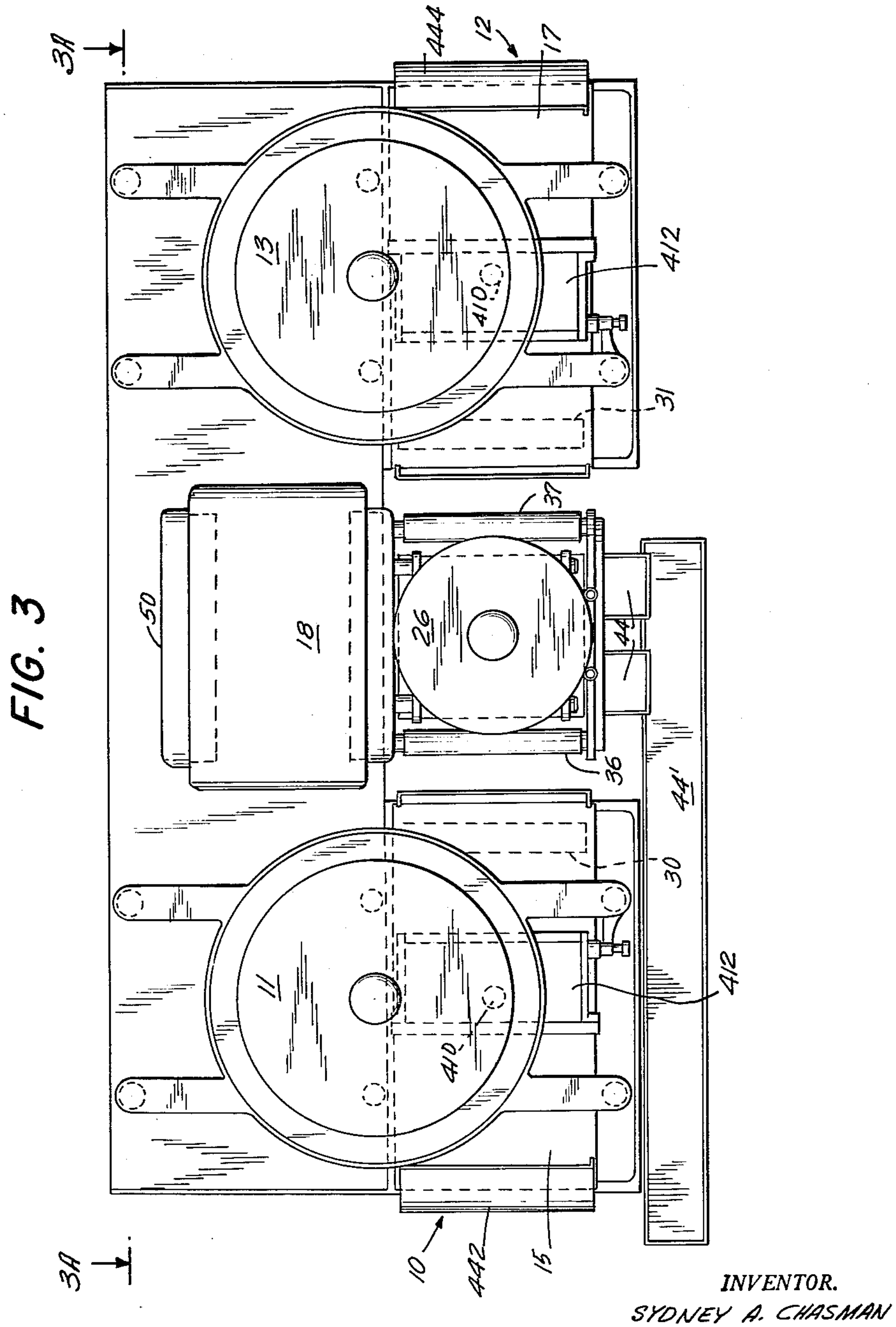
FIG. 3 is a top plan view of said embodiment, taken generally along line 3—3 of FIG. 1.
Figure 3A:
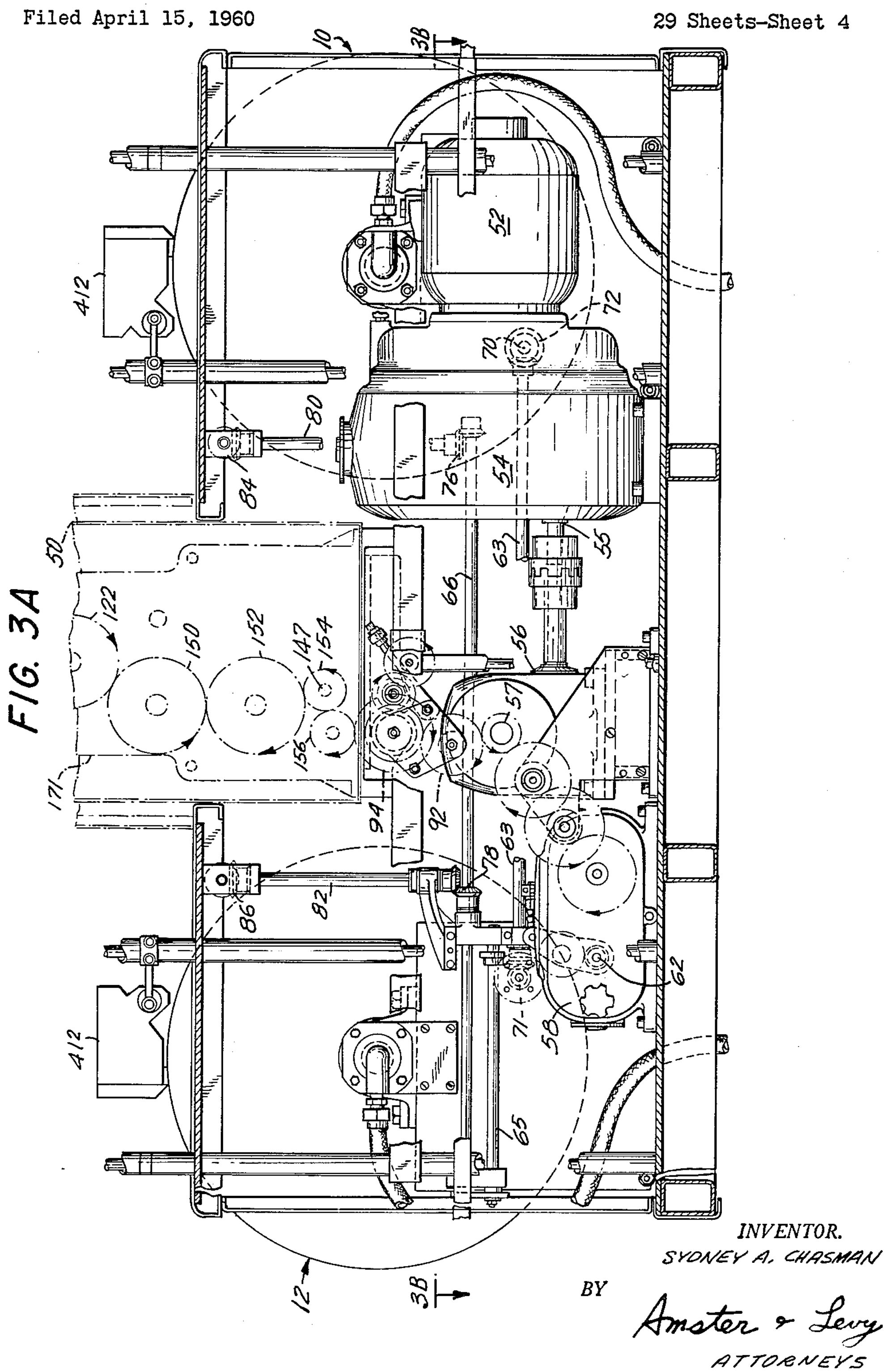
FIG. 3A is a rear sectional view of said embodiment taken along line 3A—3A of FIG. 3 with certain of the supports and brackets broken away for clarity.

The general organization of an embodiment of the present invention will now be explained with reference particularly to FIG. 1, a front elevation, FIG. 2, a side elevation and FIG. 3, a top plan view. The present embodiment includes a pair of gelatin film supply means 10 and 12 which includes gelatin reservoirs 11 and 13 respectively. In this particular arrangement, molten gelatin from reservoirs 11 and 13 is formed into thin uniformly flat ribbons of gelatin sheet 14, 16 respectively. If desired the film supply means can simply be rolls of preformed sheet previously manufactured and fed into the machine as it runs. For convenience the films are referred to as being made of gelatin but it should be understood that any inorganic plastic sheet which can be deformed under the influence of heat and pressure and likewise sealed to itself may be used. However, since one of the major uses of fluid filled capsules is medicinal, wherein medicines are enclosed in water soluble gelatin capsules the description is based on this form of capsule construction.

Gelatin sheets 14, 16 are fed to a centrally located capsule forming and filling mechanism generally identified by reference numeral 18.

Forming and filling mechanism 18 includes a pair of intermittently driven multi-faceted cylinders 20 and 22, between which gelatin films 14, 16 pass in juxtaposed face to face relationship. Between said cylinders the gelatin film is formed into a series of generally spherical or elliptical capsules and the capsules so formed are filled with a hydraulic substance or fluid from pump 24. The filling substance is contained within supply container 26 from which pump 24 dispenses measured charges of the filling material through tubes 28 to filling nozzles 29 at appropriate times during the operating cycle (see also FIG. 9). From film supply means 10, 12 the films pass over stripping rollers 30, 31 which continuously remove the films from drums 15, 17, through conditioning baths 38, $38^1$ filled with oil, between paired rollers 32, 33 and 34, 35 which remove excessive amounts of oil from the films and thence to positively driven feed rollers 36 and 37 associated with the films 14 and 16 respectively. Roller 36 is paired with a gripping roller 36′ and roller 37 is similarly paired with a gripping roller 37′. The films also pass before heaters 40 and 41 just before they meet each other between the forming cylinders 20, 22 in order to assure that the films are in proper condition for the forming and sealing operations which take place between cylinders 20, 22. The completed capsules as they leave the space between cylinders 20 and 22 are stripped from the waste sheet material by power driven strippers 42 so that they may drop into the finished work receptacles 44 from which they will be discharged into dispatching conveyor 44′ by suitable means (not illustrated). The waste sheet material is drawn away between power driven take off rollers 46 and 48 to a location at the bottom of the machine for subsequent disposition.

With particular reference to FIGS. 3A, 3B, 3C and 3D a general description of the driving mechanism for the entire machine will now be given. Electric drive motor 52 is coupled to a first variable gear reduction drive box 54 having a slot speed output shaft 55 to which is coupled a further worm gear reduction unit 56, having an output shaft 57. Output shaft 57 is coupled in parallel to two gear trains one of which drives variable gear box 58 and the other of which is coupled to the capsule forming and filling mechanism gear drive mounted on support plate 171 enclosed with cover 50 (see also FIGS. 3, 10 and 18). Output shaft 62 of gear box 58 is coupled by a train of gears including a bevel gear 64 and shaft 65 shown in FIG. 3A, to shaft 66 (FIG. 3B) running longitudinally of the machine immediately behind the film forming drums of the film supply mechanism 10 and 12. These mechanisms are geared to drive pinions 68, 69 carried by stub shafts 70 and 71 which are driven from shaft 63 by bevelled gear pairs 72, 74. Further bevelled gear pairs 76, 78 drive vertical shafts 80 and 82, respectively, which by means of still further bevel gear pairs 84, 85 drive stripper rolls 30, 31 which pull the formed sheet film off of the forming drums for the sheet film.

Now the second parallel train of gears from output drive shaft 57 progresses upwardly (FIG. 3A) through gears 92 and 94 onto gears mounted on rear support plate 171 for the encapsulating unit per-se. Mounted also on said plate is a Geneva drive mechanism which provides for the intermittent step by step rotation of the encapsulating cylinders 20 and 22 together with an intermittent timed step by step rotation of feed rollers 36, $36^1$, 37, $37^1$ and take off roller 46, mating roller 48 being driven from the drive for roller 46. The plate 171 also carries gear driven cam means for oscillating cylinders 20 and 22 from their spaced apart rotational position to a second position in which the flat faces are in face-to-face contact, cam means for operating the plate for positively locking the cylinders in aligned face to face positions, further cam means for selectively operating the internal punching and stripping means within the cylinders, and a drive for operating pump 24 and for selectively operating valves within pump 24 to assure proper timed delivery of the charges of the hydraulic fluid into the formed capsules.

Figure 4:
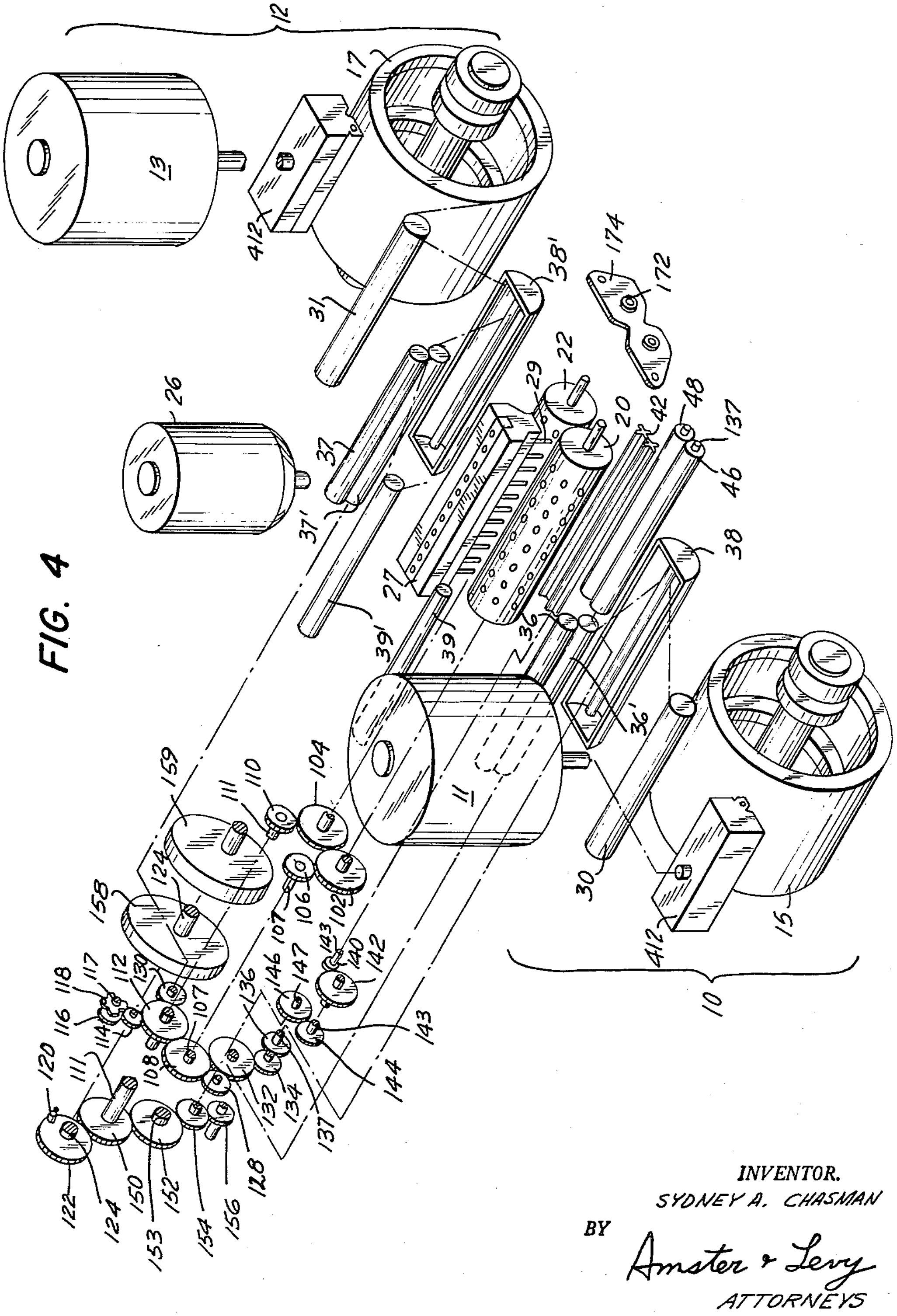
FIG. 4 is a simplified exploded perspective view of the driving train for the film feeds and capsule forming and filling mechanism.
Figure 9:
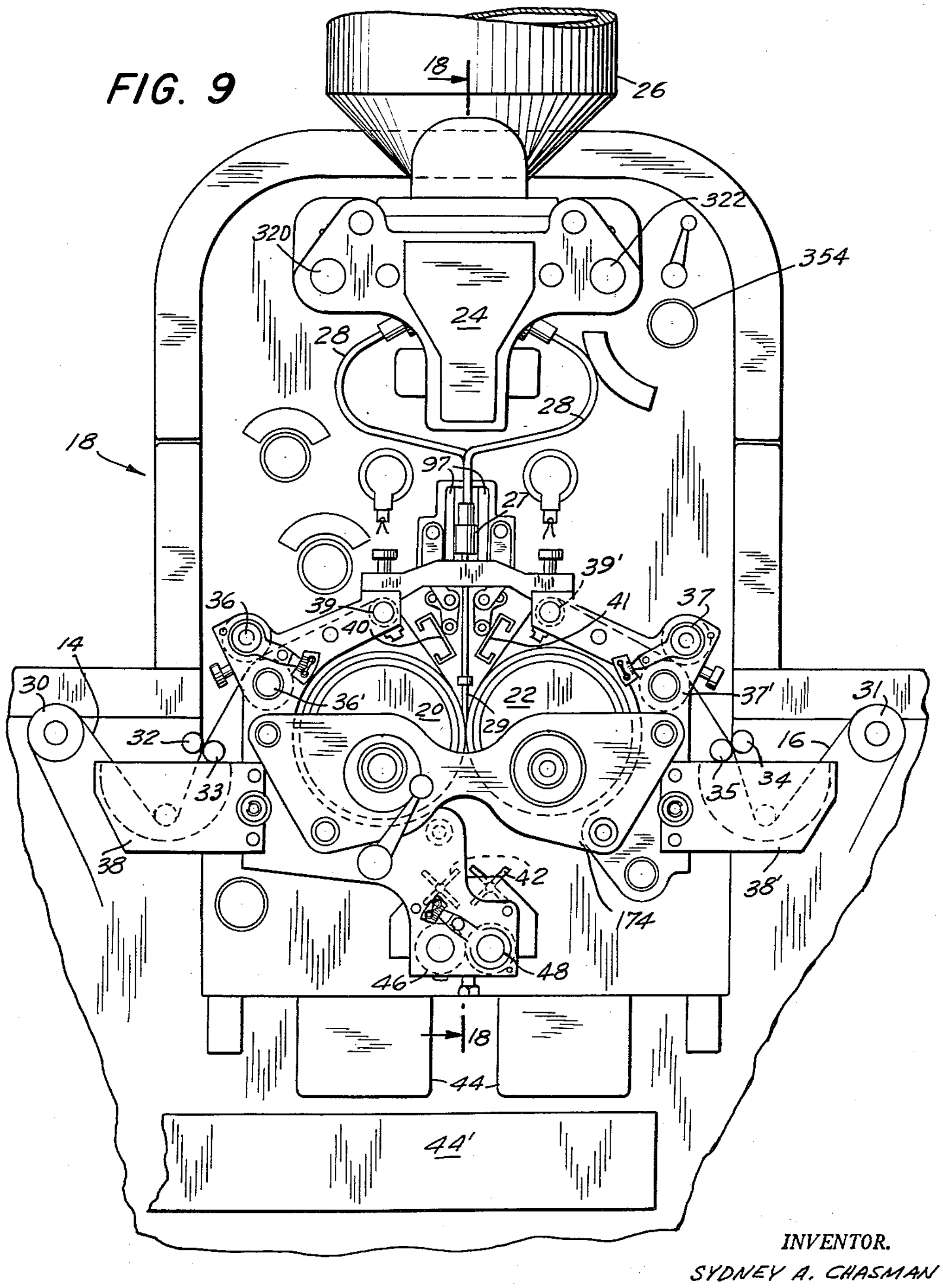
FIG. 9 is an enlarged fragmentary front elevation of the central portion of the machine of FIG. 1.
Figure 10:
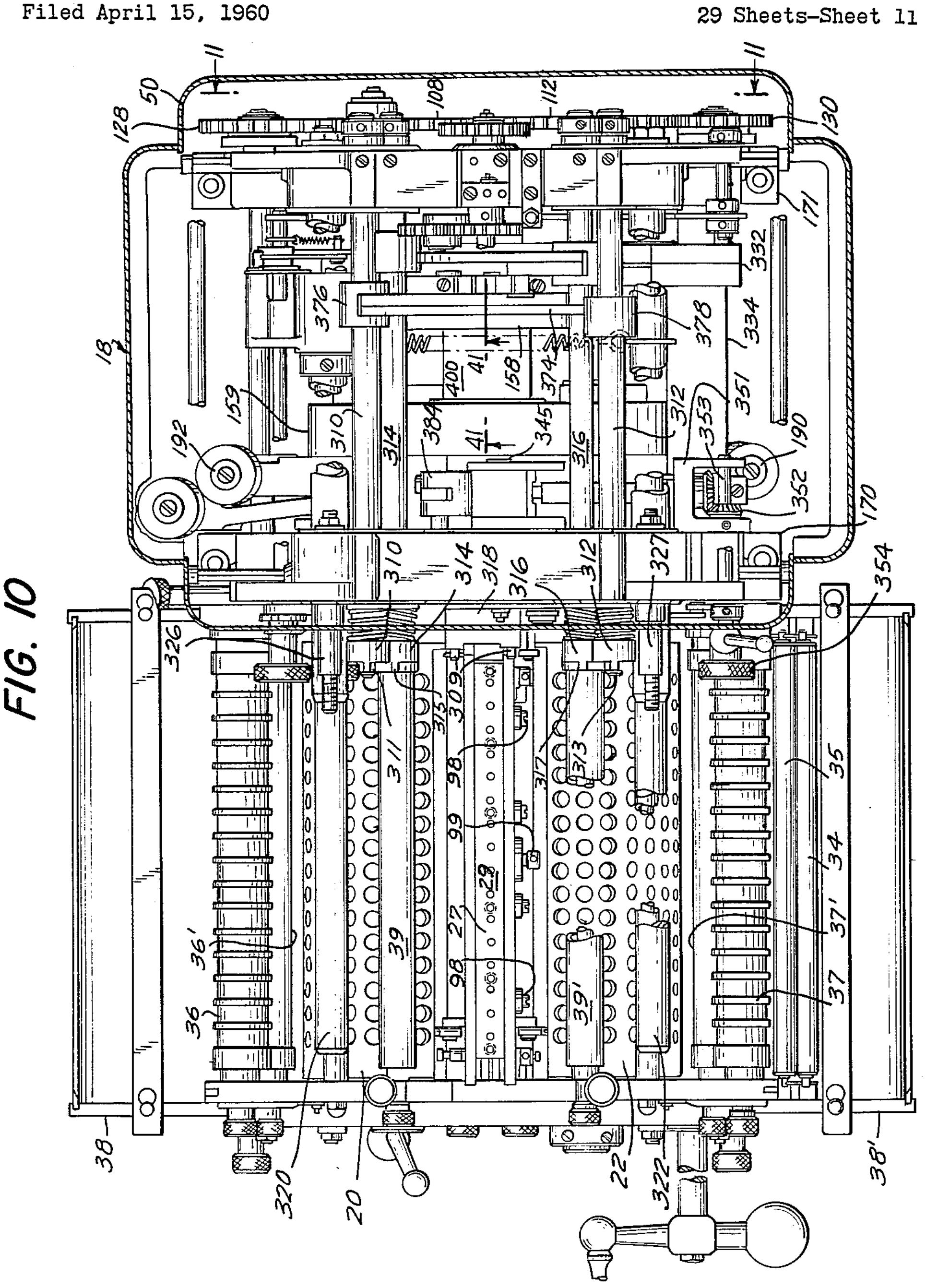
FIG. 10 is a plan view, partly in section taken generally along line 10—10 of FIG. 1, but with the pump unit removed to show more clearly the manifold block.
Figure 11:
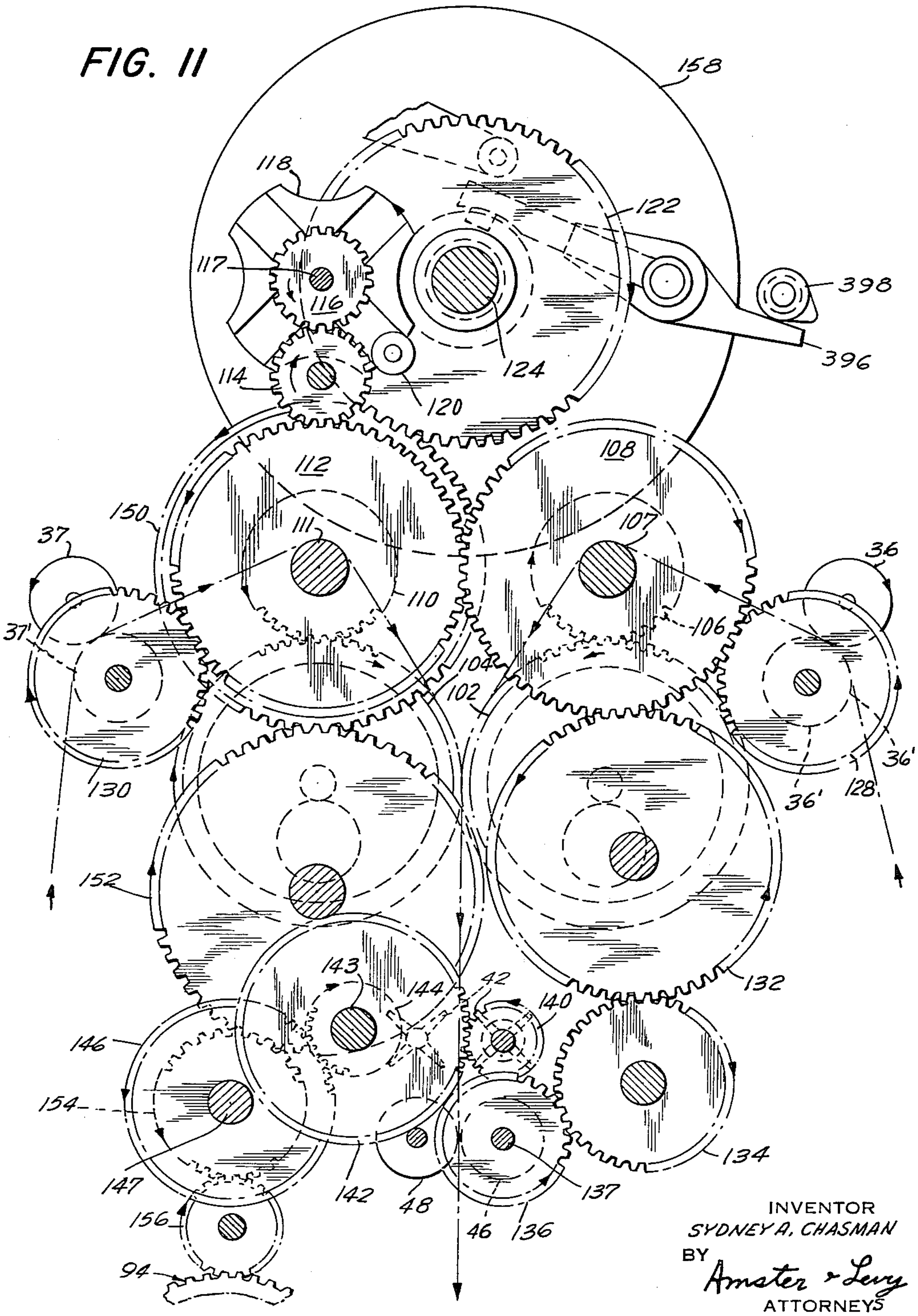
FIG. 11 is an enlarged fragmentary rear elevation view of the gear drive system taken along line 11—11 of FIG. 10 and having the rear mounting plate for the gear box omitted.
Figure 14:
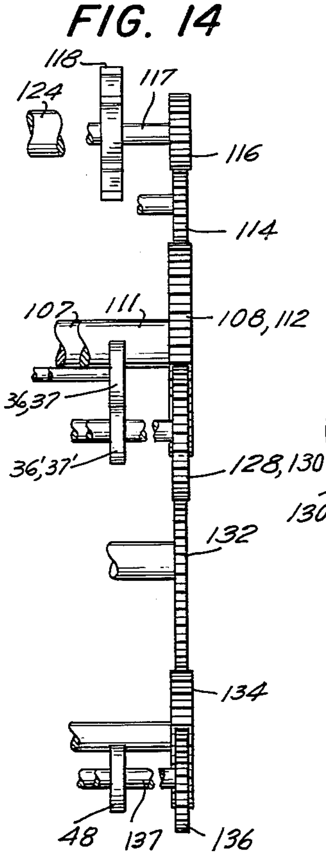
FIG. 14 is a fragmentary side elevation view of the rear area of gear drive system from the Geneva gear driven from the main cam shaft drive and including the gears involved in the intermittent drive of the cylinders, the ribbon feed rolls and the tension rolls.
Figure 15:
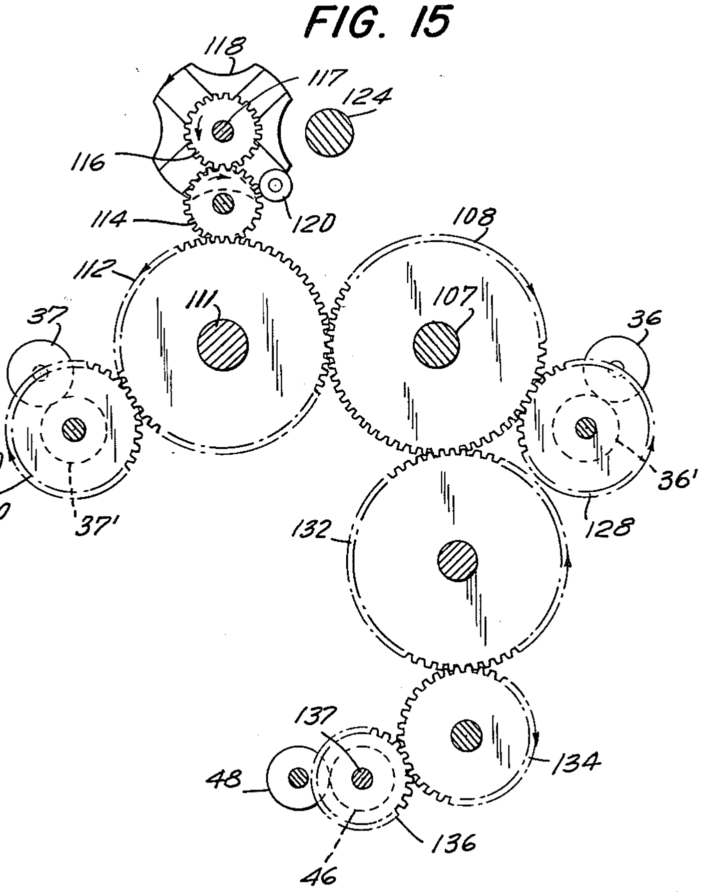
FIG. 15 is a fragmentary front elevation view of the gear train of FIG. 14.

The intermittent drive for the cylinders 20 and 22, the intermittently operating feed rollers 36, $36^1$, 37, $37^1$ and the take off rollers 46, 48 will be more fully understood by reference to the exploded fragmentary view in FIG. 4, the sectional view of FIG. 10, and the view of FIG. 11. In FIG. 4, cylinder 20 carries on its rear end a drive gear 102, while cylinder 22 similarly carries on its rear end a drive gear 104. Gear 102 meshes with a drive pinion 106 carried by shaft 107 journaled on plate 171 and on which is mounted a gear 108. Similarly gear 104 meshes with a drive pinion 110 carried by shaft 111 which is journaled in plate 171 and carries a drive gear 112. Gears 108 and 112 mesh together in mutual driving relationship and gear 112 also meshes with an idler gear 114 meshing with gear 116 carried by shaft 117. Shaft 117 also carries a Geneva star wheel 118. Geneva star wheel 118 is intermittently driven through one-quarter of a revolution by pin 120 carried by gear 122 rotatably mounted on shaft 124, for each full revolution of gear 122. Thus for each quarter revolution of Geneva star wheel 118, cylinders 20 and 22 are rotated together a distance equal to the circumferential spacing on the surfaces of the encapsulating cylinders between successive flat faces thereon. The paired feed rollers 36, $36^1$ and 37, $37^1$ are similarly moved in timed intermittent relationship by gears 128 and 130 meshing with gears 108 and 112 respectively. Final take-up feed rollers 46 and 48 must similarly be driven in timed relationship with the motion of the cylinders 20 and 22. This is accomplished by a gear drive running from gear 108 (see also FIGS. 14 and 15) through gear 132 meshing therewith, gear 134 meshing with gear 132 and feed roller gear 136 carried on shaft 137 which carries feed roller 46. Rollers 39—$39^1$ are coaxial with but not driven by shafts 107–111, being free to turn thereon to guide the plastic films to the encapsulating positions of cylinders 20—22 (see also FIGS. 1 and 9).

Figure 16:
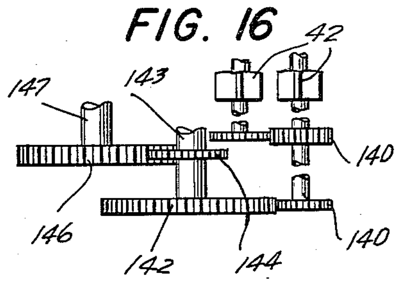
FIG. 16 is a fragmentary top plan view of a further portion of the system showing the continuous stripper drive.
Figure 17:
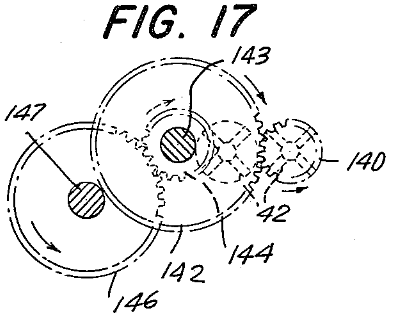
FIG. 17 is a fragmentary rear elevation view of the gear train of FIG. 16.

The strippers 42 for stripping the completed capsules from the output ribbon or film, are driven by gear 140 which meshes with gear 142 carried on shaft 143 which also carries gear 144 which meshes with gear 146 on shaft 147 (FIGS. 11, 16 and 17). Geneva drive gear 122 is driven by gear 150 journalled on shaft 111. It, in turn, meshes with intermediate gear 152 which meshes with gear 154 carried on shaft 147. Gear 154 meshes with a further drive gear 156 which receives its rotation from the motor drive by meshing with gear 94.

Figure 27:
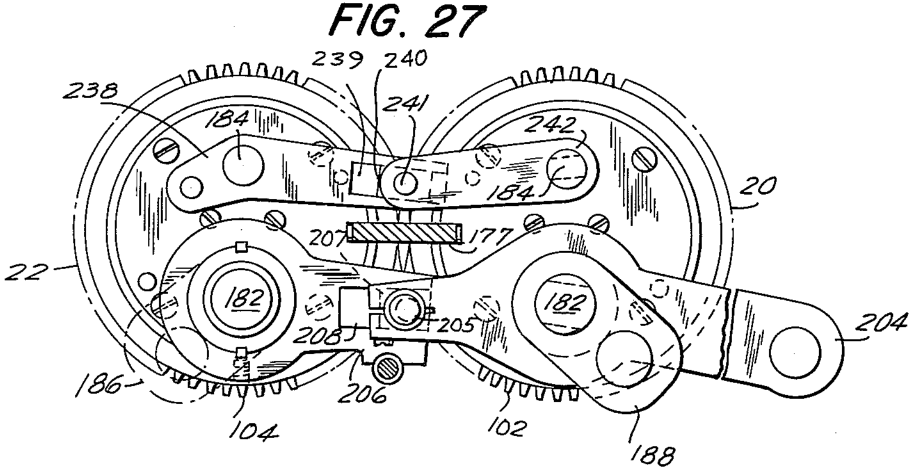
FIG. 27 is a fragmentary rear sectional view taken along line 27—27 of FIG. 25 showing the operating mechanism for rocking the cylinders under cam control.
Figure 28:
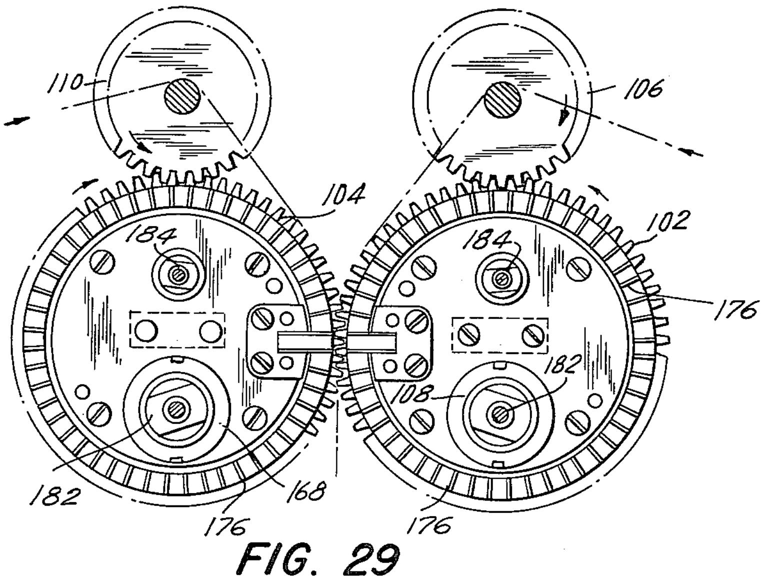
FIG. 28 is a vertical cross section view, taken along line 28—28 of FIG. 25, showing from the rear the intermittent cylinder drives and configuration of gear teeth to permit lateral motion of the cylinders for locking.
Figure 29:
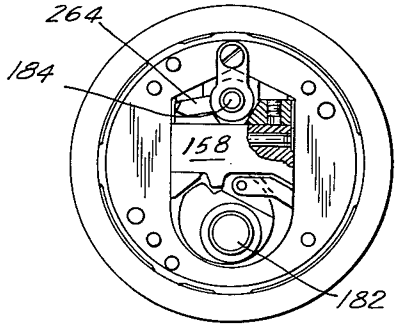
FIG. 29 is a vertical section view, taken along line 29—29 of FIG. 26, showing in end view the die punch plunger and plunger operating mechanism within the drum.
Figures 30, 31:
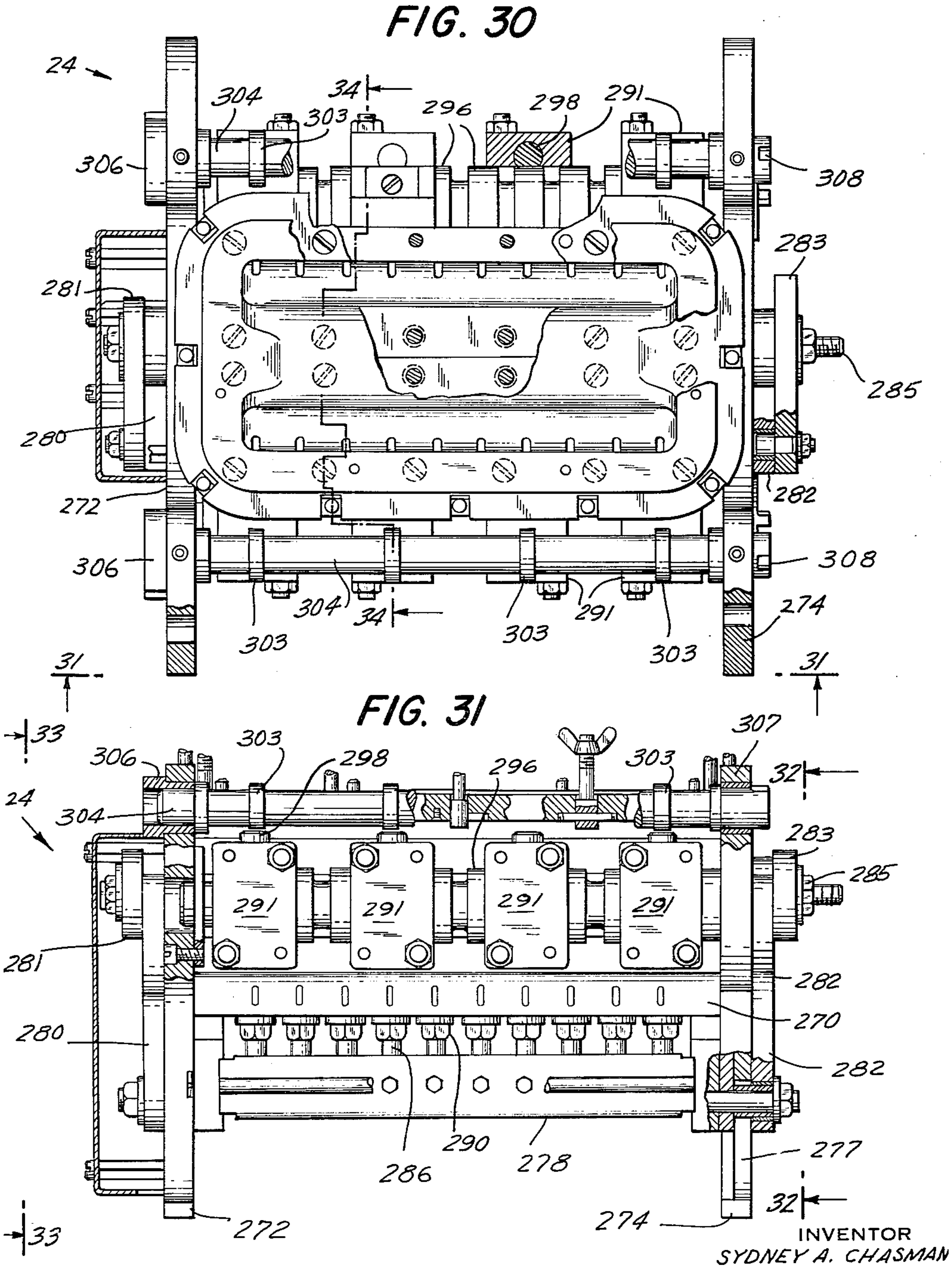
FIG. 30 is a top plan view of the metering pump, partly in section and with the fluid supply container removed.
FIG. 31 is a side elevation of the metering pump taken along line 31—31 of FIG. 30.

Indexing of the cylinders 20 and 22 now having been explained, as well as the coordinated motion of the various feed rollers whereby the gelatin film is supplied to the cylinders and the waste film drawn away from the area between the cylinders, the mechanism by means of which the cylinders are caused to approach towards and recede from each other at the beginning of and at the conclusion of each cycle of stepwise rotation will now be explained, as well as the drive mechanism for the various die punches and plungers within the cylinders. Reference will also be made to the drive and timing mechanism for assuring appropriate timed delivery of the fluid into the formed capsule. All these operations are initiated, timed and controlled by cams 158 and 159 locked together and carried on shaft 124 (see FIGS. 10, 18 and 19). However, the peculiar arrangement of each of the cylinders and their mounting for rotation and reciprocation toward and away from each other will first be described. This can best be understood by reference to the sectional views in FIGS. 20, 25, and 26. The description will be particularly directed to the details of cylinder assembly 20 though it should be understood that the interior construction of cylinder 22 is essentially similar, the two however, being arranged as mirror images one with respect to the other. Cylinder 20 is a hollow cylinder having a polygonal outer periphery including a number of flat faces 160. Each flat face is provided with a longitudinal array of apertures 162 let into flat face 160. The interior of the cylinder is cylindrical and is supported for rotation on bearing block 164. Bearing block 164 has a cylindrical bearing shoe 165 along one side against which the interior of the cylinder bears and a plurality of longitudinal bearing rollers 166 received within longitudinal recesses 167. Thus the hollow cylinder can rotate smoothly and easily about the main bearing block 164 without excessive play. At the rear end, bearing block 164 is provided with an eccentrically located hollow bearing stub 168 (FIG. 25) received in a suitable bearing 169 in main plate 170. The inner bore of bearing 169 is eccentric with relation to its outer periphery so that by rotation of bearing 169 within its bore, the bearing blocks can be moved slightly toward or away from each other, to adjust the spacing between cylinders 20, 22. Each bearing block 164 is provided at its front end with a stub bearing 172 axially aligned with stub bearing 168 and received within an appropriate bearing aperture in front bearing plate 174. Thus, the two bearing blocks and consequently the cylinders 20 and 22 are maintained rigidly in their predetermined parallel axis position while still being capable of oscillation about the centers of stub shafts 168, 172 as previously explained. Preferably front stubs 172 are received in eccentric bushings 173 in front plate 174 which may be rotated within front plate 174 to provide for accurate axial adjustment of bearing blocks 164. Cylinder 20 is provided at its rear end, just in front of main plate 170, with drive gear 102 and cylinder 22 is similarly provided with drive gear 104. These gears are driven respectively by pinions 106 and 110 as previously explained and as shown in FIGS. 4, 27 and 28 in order to provide for timed simultaneous rotation in opposing relationship. The teeth of gears 102, 104 are formed so that they clear each other and do not mesh in driving relationship but, because they are driven by pinions 106 and 110, synchronized rotation of the cylinders 20, 22 is accomplished, while said cylinders are rocked about the centers of the stub shafts 168, 172. This motion slightly disturbs the mating depth of the teeth of gears 102, 104 but is insuffcient to cause disengagement. Cylinders 20 and 22 are also provided at their rear ends, adjacent the driving gears 102, 104, with axially extending locking teeth 176 (see also FIG. 18) which are adapted to cooperate with lock plate 177. Lock plate 177 is arranged to protrude through an appropriate aperture in main plate 170 at predetermined times in the cycle of operation. The engagement of locking plate 177 with the locking teeth 176 positively aligns a pair of opposed flat faces 160 of the cylinders 20 and 22, during the times when they approach one another in a flat face to face relationship. Oscillation of bearing blocks 164 for cylinders 20 and 22 about the axis of stubs 168 and 172 causes the peripheries of cylinders 20 and 22 to approach towards and recede from each other.

Figures 5, 6:
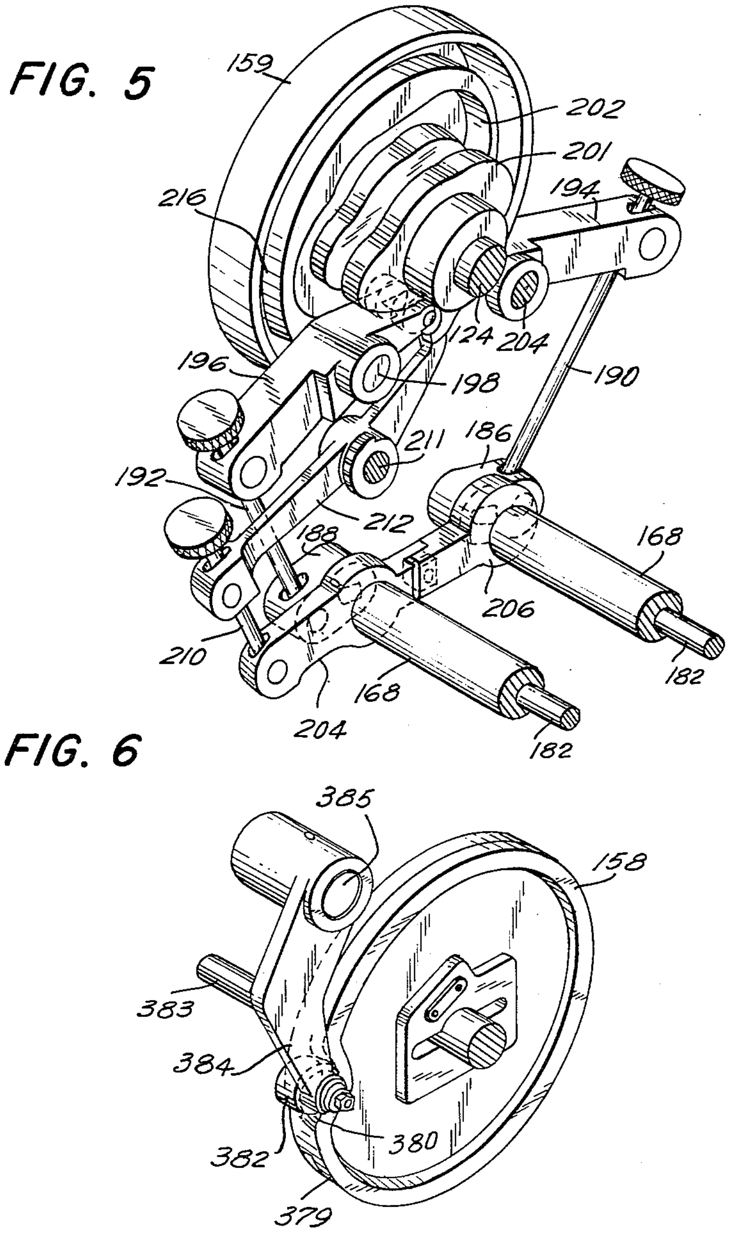
FIG. 5 is a perspective front face view of the punch and die drive oscillating cam with the related cam followers and portions of the linkages leading to the members to be operated thereby.
FIG. 6 is a perspective face view of the pump valve cam and clutch release cam with the related cam followers and portions of the linkages leading to the members to be operated thereby.

Stub shafts 172 and 168 are provided with concentric bores 178 and 180 respectively in which is journalled a crank shaft 182. Parallel to the axis of crank shaft 182 and within bearing block 164 is a latch shaft 184 which extends rearwardly through an arcuate aperture 185 in back plate 170. Crank shaft 182 for each of the cylinders 22 and 20, at its rearwardly extending end, is rigidly coupled to first crank arms 186, 188 respectively coupled by adjustable length links 190, 192 to pivoted cam follower arms 194, 196 respectively (see FIGS. 5 and 19). Cam follower arm 196 is pivoted at 198 and bears on its free end a cam follower roller 200 which operates against punch operating cam 201 joined to shrouded cam face 202 in cam 159. Cam follower arm 194 is pivoted on journal 204 and has at its free end a forked portion 206 which surrounds the free end of cam follower arm 196 so that both cam followers are constrained to operate in unison as driven by the cam 201 and cam track 202. Thus as cam 159 rotates, the two crank shafts 182 within cylinders 20 and 22 are caused to operate simultaneously. The relative phases of operation of the two crank shafts can be adjusted as desired by screw adjustment of the variable length links 190 and 192.

Shafts 168 for each of the supports for the cylinders 20 and 22 are provided at their rear ends, back of main support plate 170, with further crank arms 204 and 206 respectively keyed thereto. Crank arm 204 is provided at one end with a pin 205 which carries a bearing block 207 mounted for sliding movement within slot 208 in crank arm 206. Thus the two crank arms are constrained to move simultaneously in opposing directions as driven by adjustable length link 210 coupled to the rear end of cam follower arm 212. Said cam follower arm is journalled on pivot 211 and bears at its other end, cam follower roller 214. Cam follower roller 214 rides within shrouded cam slot 216 on the front face of cam 159. Thus as cam 159 rotates, bearing blocks 164 for cylinders 20 and 22 are constrained to move towards and from each other in accordance with the profile of cam track 216.

Figure 7:
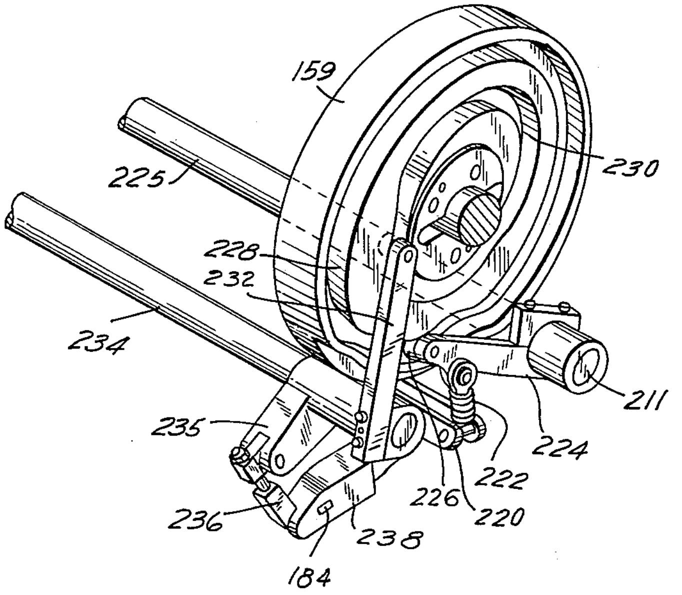
FIG. 7 is a perspective rear face view of the cam shown in FIG. 5.

Cylinder lock 177 is operated from cam 159 through the following linkage. Lock 177 is coupled at its rear end to bell crank lever 220 (FIGS. 7 and 18), pivoted at 221 and coupled at its free end to link 222 which in turn is coupled to cam follower arm 224, pivoted on journal 211 and carrying a cam follower roller 226 running in shrouded cam surface 228 on the rear face of cam 159. Cam surface 228 is so oriented with respect to pin 120 in the Geneva drive mechanism that it will lock cylinders 20 and 22 only when they are stationary.

Cam 159 carries on its rear face a shrouded cam track 230 which actuates cam follower arm 232 journalled on shaft 234. Cam follower arm 232 has rigidly secured thereto a crank arm 235 coupled by link 236 to latch-bar crank arm 238, said crank arm being rigidly secured to the shaft for latch-bar 184. Crank arm 238 has a front extension beyond its point of attachment to shaft 184, provided with a slot 239 in which is received a sliding block 240, said sliding block being pivotally secured by pin 241 to crank arm 242 secured to a lock shaft 184 for die cylinder 20. Thus latch-bar 184 within each of the cylinders 20 and 22 is constrained to operate in properly timed relationship with the other under control of cam track 230.

Figure 20:
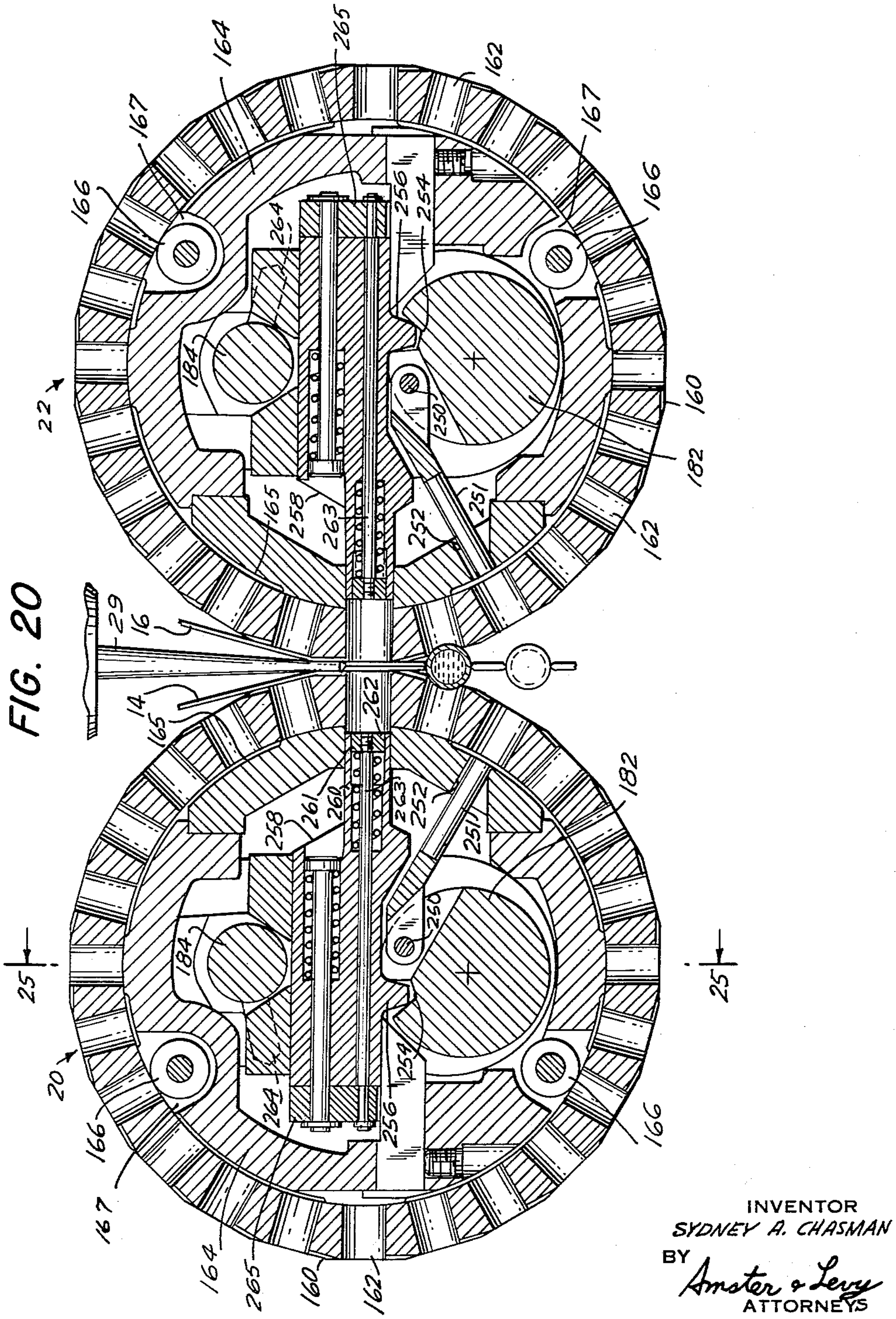
FIG. 20 is a vertical cross section view taken along line 20—20 of FIG. 2 showing nozzles, ribbons, cylinders, punches, plunger and kickers, and fluid filled capsules.
Figures 25, 26:
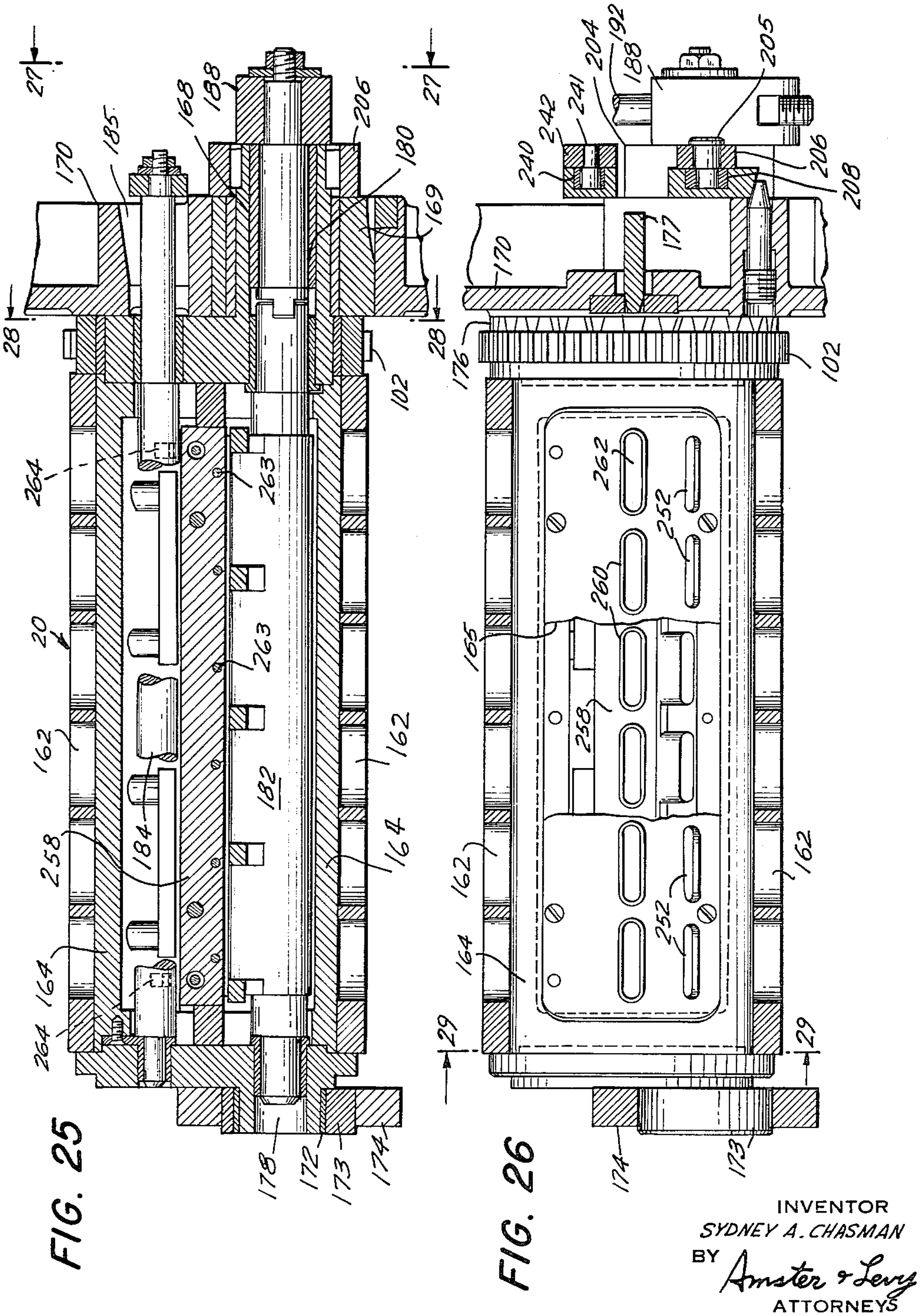
FIG. 25 is a vertical cross section view taken along line 25—25 of FIG. 20 showing details of the support of the cylinders providing for rotation, oscillation and locking, together with the operating mechanism for driving the die punches and plungers.
FIG. 26 is similar to FIG. 25 but with the cylinder cut away to show the locking mechanism more clearly.

Now to return to the interior of cylinder 20 as shown in FIGURES 20 and 25, additional elements coupled to crank shaft 182 and latch shaft 184 will be described. The same elements of course appear within cylinder 22 but will not be separately described since they are identical except for being mirror images of those in cylinder 20. Each crank shaft 182 carries a co-axial crank pin 250 on each of which is pivoted a series of punch rods 251 extending through apertures 252 aligned with each of the apertures 162 along one of the flat faces 160 on the exterior surface of the cylinder in a position two steps following the faces which are in a flat face-to-face relationship. At that location, each completed capsule should be free of the aperture 162 in which it was formed, but if it is not, a clockwise rotation of crank shaft 182 causes the "kicker" punch rods 251 to extend through apertures 162 and thus free the capsule. The crank shaft also carries a longitudinally extending cam slot 254 parallel to the longitudinal axis of the crank shaft. Cam slot 254 cooperates with a punch operating finger 256 carried by punch block 258. Punch block 258 is suitably guided for slidable motion along a diameter of cylinder 20 and carries on its front end a number of hollow punch members 260 operating through holes 261 in bearing shoe 165. Said holes are arranged in axial alignment with apertures 162 in those flat faces 160 of cylinders 20 and 22 which are in face to face opposed alignment. Thus as crank shaft 182 is rotated cam slot 254 bears against finger 256 and moves the entire punch block 258, that in cylinder 20 to the right and that in cylinder 22 to the left, so that punches 260 extend through apertures 162 until they each bear against opposite sides of the gelatin films 14, 16 captured between the flat faces of cylinders 20, 22. If punch latches 184 are in the position shown in FIG. 20 during this operation, the internal plungers 262 within punches 260 and carried by plunger rods 263 move toward each other with the punches 260 so that a flat face is presented to the gelatin on each side thereof and any imprisoned air is forced out. The punches and plungers are then retracted by the operation of the mechanism. In the next operation of the punch blocks, the latch shafts 184 and the fingers 264 secured thereto are swung into the path of the spring loaded plunger retaining bars 265, thus preventing the internal plungers 262 from being carried toward the gelatin strips in conjunction with the punch blocks 258. This in no way, however, inhibits the motion of punch block 258. Thus punches 260, alone, are moved forward so that their front edges are pressed together against opposite sides of the gelatin films. The operation of punches 260 alone is arranged to give an extended pressure cycle so that the gelatin sheets are not merely pressed together, but are positively sealed together in a narrow zone at the periphery of the captured area and the capsule thus formed essentially cut free of the remainder of the sheets.

Figure 38:
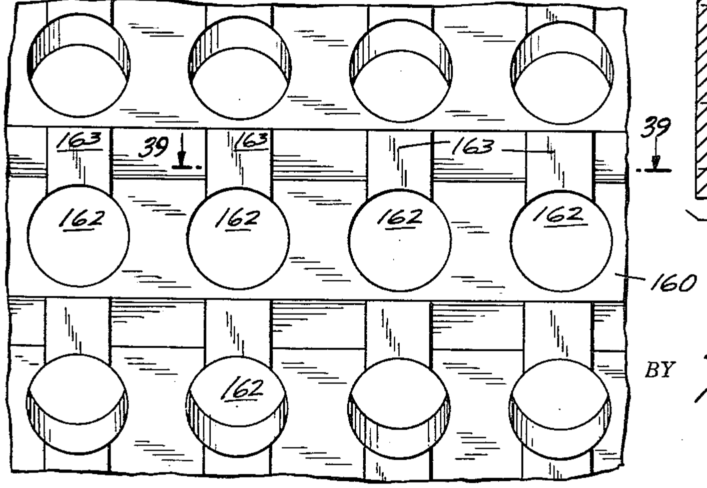
FIG. 38 is a fragmentary enlarged plan view of a further modification for producing spherical capsules and detailing the changes in drum surface formation including the holes, recesses and flats to accomplish this modification.

As shown more clearly in FIG. 38 each of the cylinders 20 and 22 has in its flat faces 160 a row of longitudinally aligned circular apertures 162 along each of the flat faces. Between the upper edge of each flat face and the adjacent edge of each of the apertures is provided a slight groove or depression 163 which allows clearance for filling nozzle 29 to insert the filling material between cylinders 20 and 22 and between gelatin films 14 and 16 without disturbing the face to face contact of the flat faces 160 of the two cylinders.

Figure 18:
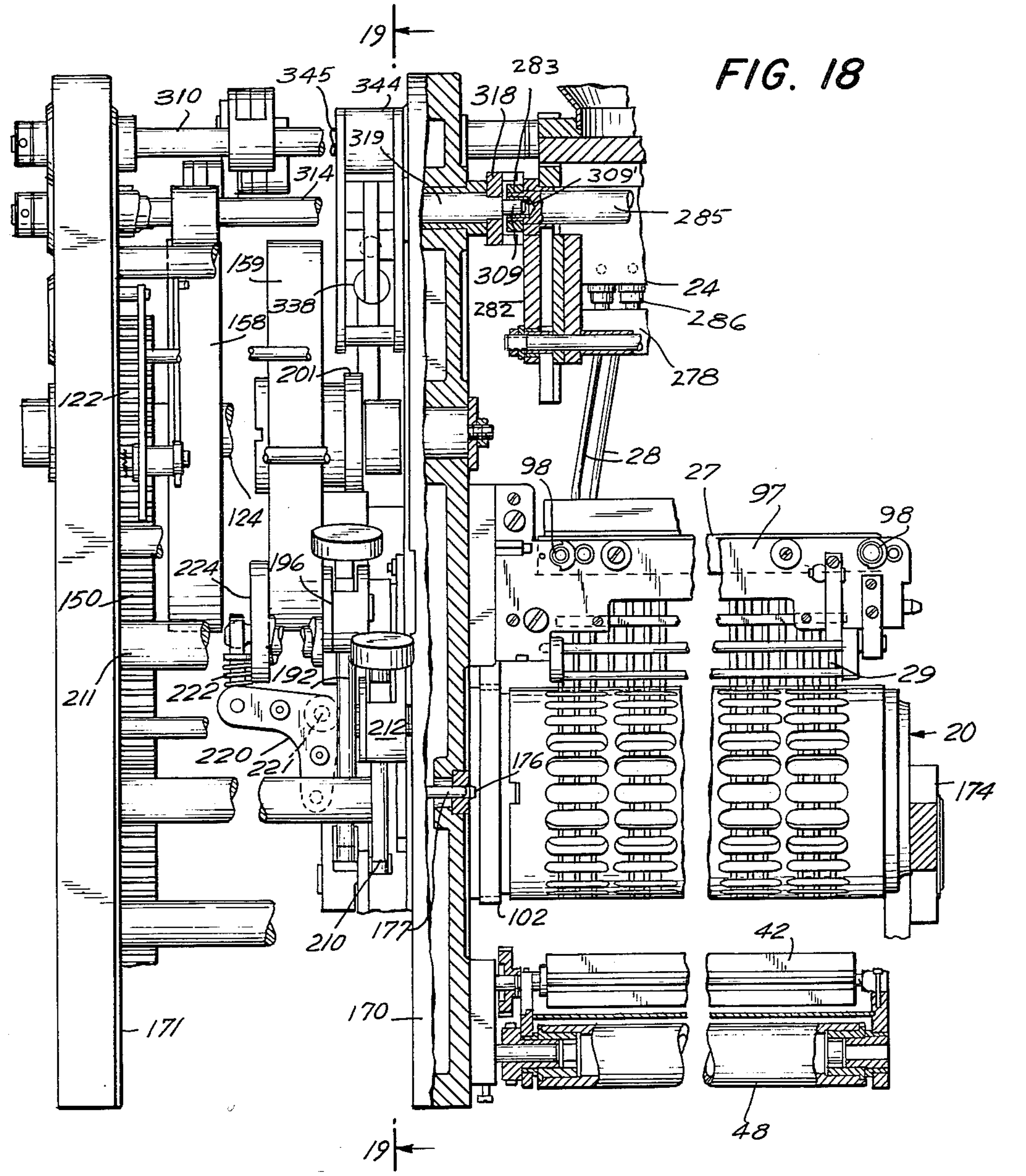
FIG. 18 is a fragmentary vertical cross section view taken along line 18—18 of FIG. 9 showing the filling fluid pump drive, fluid pipes, cylinders and cams.

Nozzles 29 are carried on a nozzle support bar 27 adjustably mounted in support brackets 97 supported on main frame plate 170. The vertical position of the nozzles overall and at each end is adjustable as desired by cam screws 98 while the overall front to back adjustment is carried out by central cam screw 99 (FIGS. 10 and 18). Thus the penetration of nozzles 29 into the space for the formation of the capsules and their alignment with clearance grooves 163 may be accurately controlled.

When spherical capsules are to be formed, one nozzle for each aperture 162 in cylinders 20, 22 is adeqate, but if elongated apertures 162*a* and 162*b* are used such as shown in FIGS. 18, 35, 36 and 37 two or three may be used if desired so that the capsules may be filled with greater rapidity.

Figure 21:
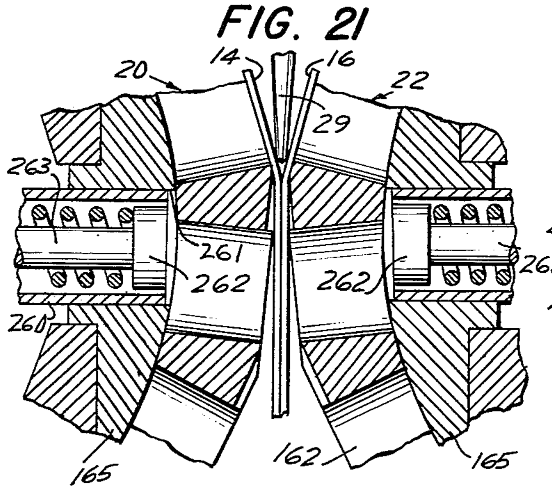
FIG. 21 is an enlarged fragmentary sectional view of the capsule forming location showing an initial position of the capsule forming cylinders separated for ribbon feeding (out of flat) with the plungers and punches retracted.
Figure 22:
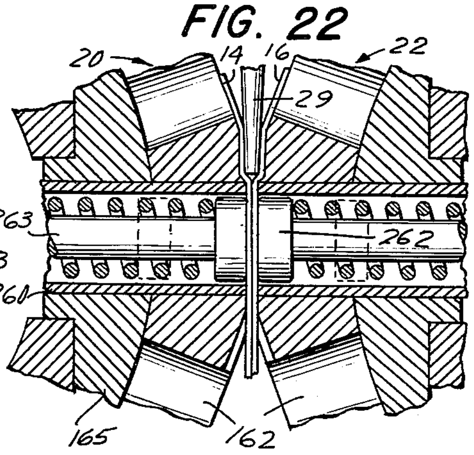
FIG. 22 is similar to FIG. 21 but further shows a later step in the sequence of operations, with the cylinders in closed, flat relationship and the die punches and plungers inserted to air expelling position of ribbons.
Figure 23:
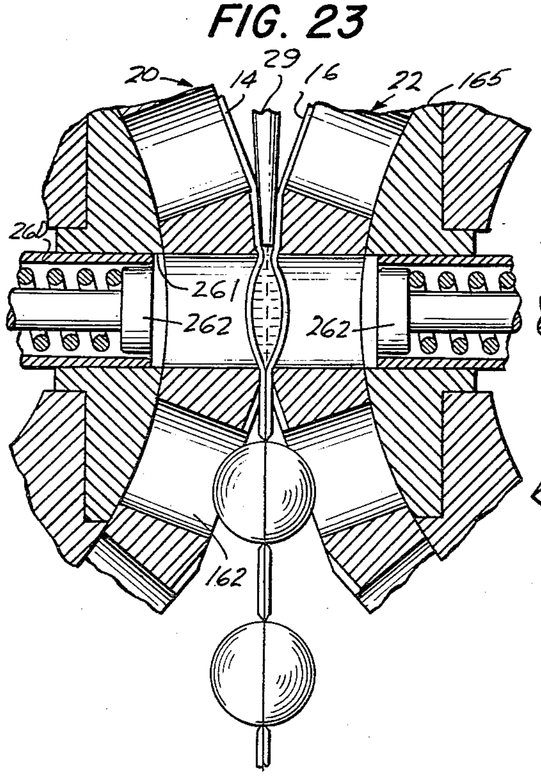
FIG. 23 is similar to FIG. 21 but shows a still later step in the sequence of operations, with the cylinders in the closed, flat relationship and partial filling of ribbons from the nozzles, the die punches and plungers being retracted.
Figure 24:
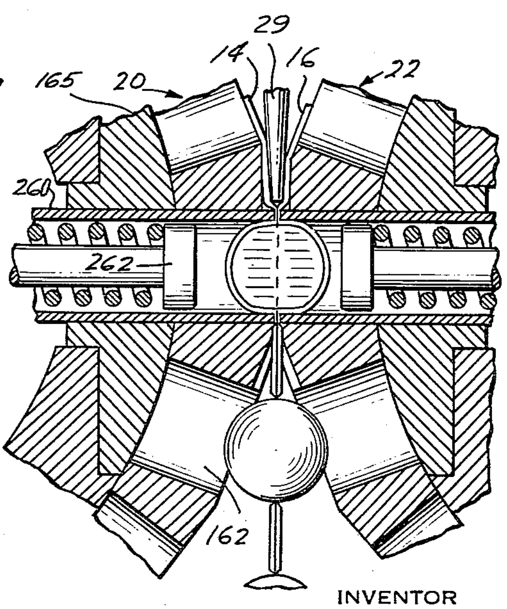
FIG. 24 is similar to FIG. 21 but shows yet a later step in the sequence of operation with the cylinders in closed flat relationship, with the capsules filled and being formed and then sealed by coaction of the punches (the plungers being retracted)
Figure 40:
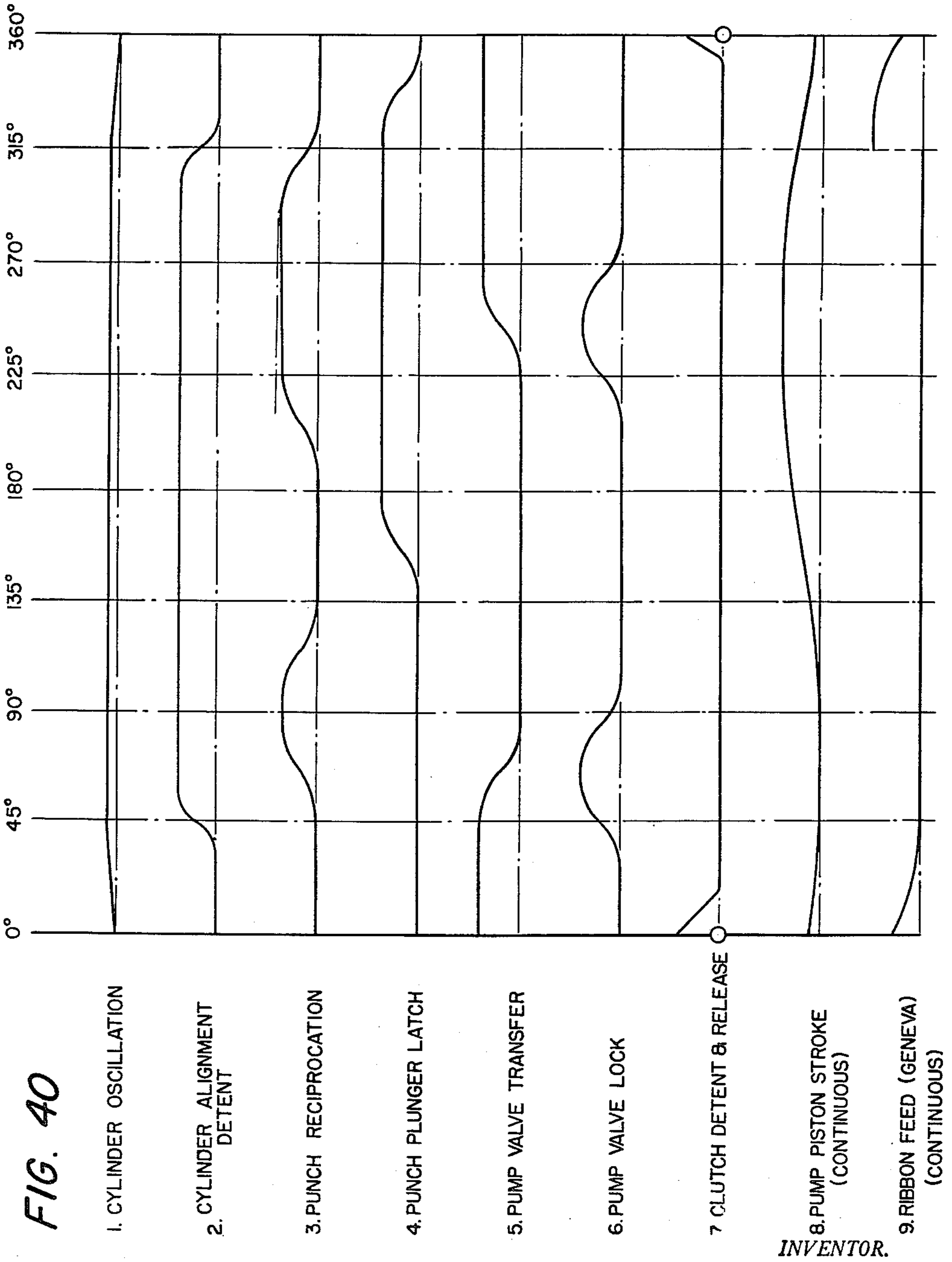
FIG. 40 is a cam chart illustrating the relative timing of the various operations of the machine in producing capsules.

Now referring to FIGS. 20, 21, 22, 23 and 24, the sequence of operations by means of which a row of completely filled gelatin capsules is accomplished will be described. FIG. 21 illustrates the relative position of cylinders 20 and 22 as the bearing blocks 164 are being retracted to compensate for the varying diameters of the exterior polygonal surfaces of cylinders 20, 22 as they are rotated, but still permitting a uniform separation of the cylinder peripheries so that a firm grip is maintained on the gelatin strips, whereby reliable drive for the strips is assured. Essentially during rotation of cylinders 20, 22, no matter whether the flats in the corners of the polygonal surfaces of cylinders 20, 22 are presented to one another along a plane passing through their axes the separation between them is constant and just sufficient to allow driving contact with the gelatin strips. It will be noted that punches 260 and plungers 262 are retracted within the bearing block so as to permit free rotation of the cylinders under the driving influence of pinions 106, 110 (FIG. 28). The rotation of cylinders 20 and 22 continues until the next pair of flat faces are in alignment and the apertures 162 are also in alignment. As the rotation of the cylinders by means of the Geneva drive mechanism 118 ceases, cam surface 228 (FIG. 7) operates the cylinder lock mechanism causing lock plate 177 to enter between a pair of aligned locking teeth 176. This all takes place in the final 45° and the first 45 degrees of the cam chart of FIG. 40 wherein curve 9 shows the cycle of the Geneva drive, curve 1 shows the oscillation of the cylinders into their facing position and curve 2 shows the operation of the lock 177 all taking place within that period of time. Crank shafts 182 are then operated, with the latch shafts 184 in the unlocked position (as shown by curve 3, FIG. 40) and both punches 260 and plungers 262 are caused to be operated toward each other to a position as shown in FIG. 22. Note that curve 4 (FIG. 40) shows that the latch is unlocked for the first 135° of the chart so that both punches and pistons operate. The pressure of plungers 262 ensures the positive expulsion of any air that may be entrapped between the two gelatin sheets 14 and 16. Crank shafts 182 are then returned as indicated by curve 3 (FIG. 40) between about 100° and 135° causing retraction of the punches 260 and plungers 262 and at the same time the pump mechanism to be described in detail later supplies a measured charge of the filling substance under pressure through the nozzle as shown in FIG. 23. The hydraulic pressure causes the gelatin films to be inflated into a generally spherical configuration, the films being held tightly around substantially the entire periphery except at the location of the relief for the entrance of the filling material, by the pressure of the flat faces of cylinders 20, 22. The filling operation having been completed, the crank shafts 182 are again operated in a direction toward the gelatin strips as shown by the rise in curve 3 of FIGURE 40 between 180° and 225°, but this time the plunger latches 184 are moved into the path of the plunger retaining bars 265 as shown by the rise in curve 4 (FIG. 40) approximately beginning at 145°. Thus, the relatively thin hollow cylindrical punch members 260 are caused to approach one another as shown in FIG. 24. The temperature of the machine, the gelatin films and the filling fluid are such that the pressure of the hollow punches 260 one against the other causes a sealing operation to take place between the two gelatin sheets. Note that curve 3 in FIG. 40 shows the extended time controlled pressure of "squeeze" from 225° to 290° to assure the sealing. There thus results a substantially spherical gelatin capsule entirely filled with the desired hydraulic substance within, held only lightly, if at all, by the flash between the spherical portion and the surrounding undistorted and unused flat gelatin film portions. Operation of cam 159 then causes the unlocking of the plate 177 at about 315° (FIG. 40, curve 2) and subsequently a rocking of bearing blocks 164 causing the two cylinders to recede from one another and allowing rotation as shown by curve 1 in that figure. At this time, the Geneva drive again picks up (curve 9, FIG. 40 at 315°) and rotates the cylinders to the next position where flat faces of cylinders 20, 22 are in engagement when the Geneva drive mechanism completes its drive and the sequence of operation just described, repeats. The take-off rollers 46, 48 are also driven in timed relation to the motion of the cylinders to draw off the scrap sheet.

The pump mechanism which supplies, under pressure, the fluid for filling the capsules and its driving arrangements will now be described.

Figures 32, 33, 34:
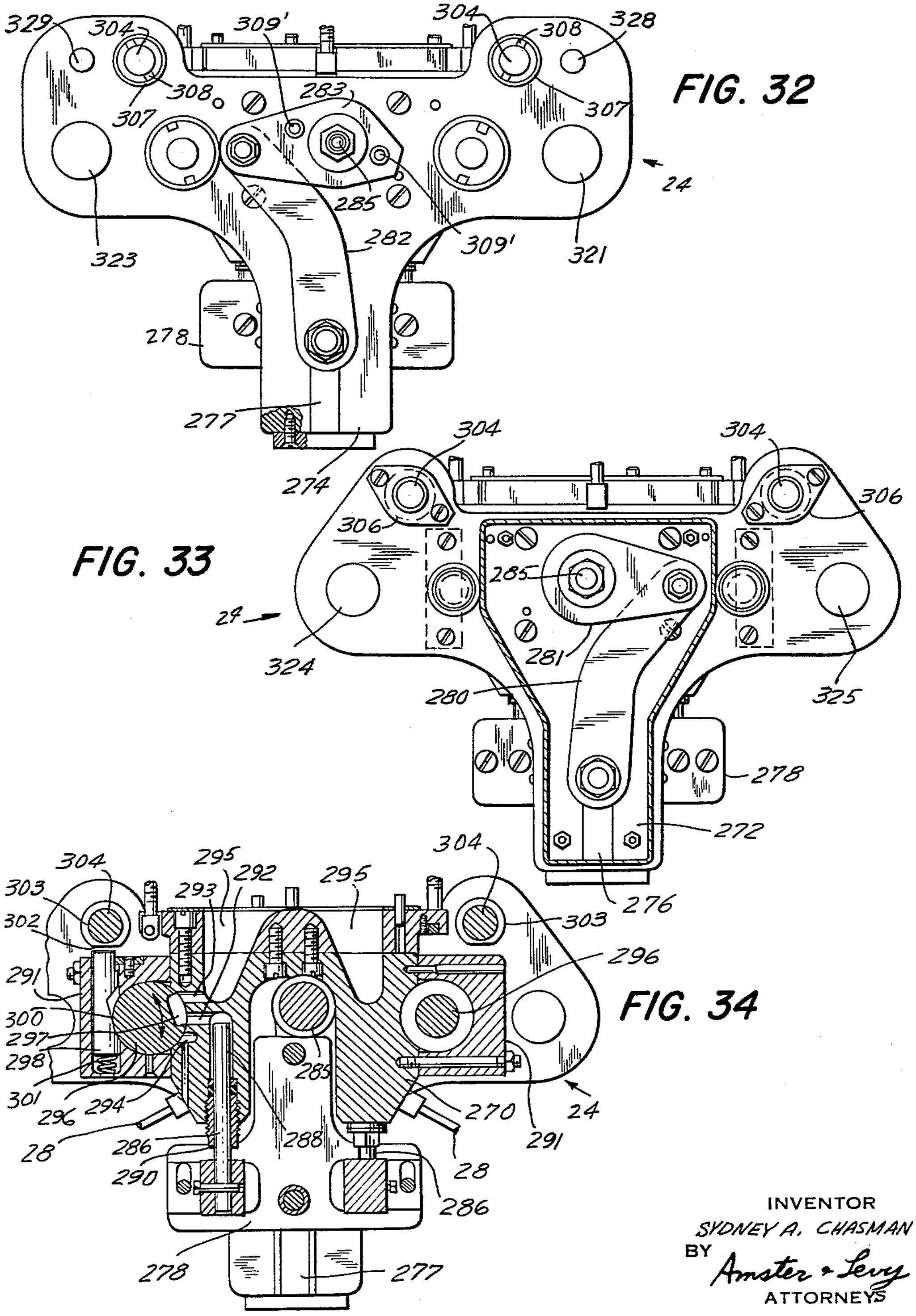
FIG. 32 is a rear elevation view of the metering pump, taken along line 32—32 of FIG. 31.
FIG. 33 is a front elevation view of the metering pump taken along line 33—33 of FIG. 31.
FIG. 34 is a vertical cross section view of the metering pump taken along line 34—34 of FIG. 30.
Figures 35, 36:
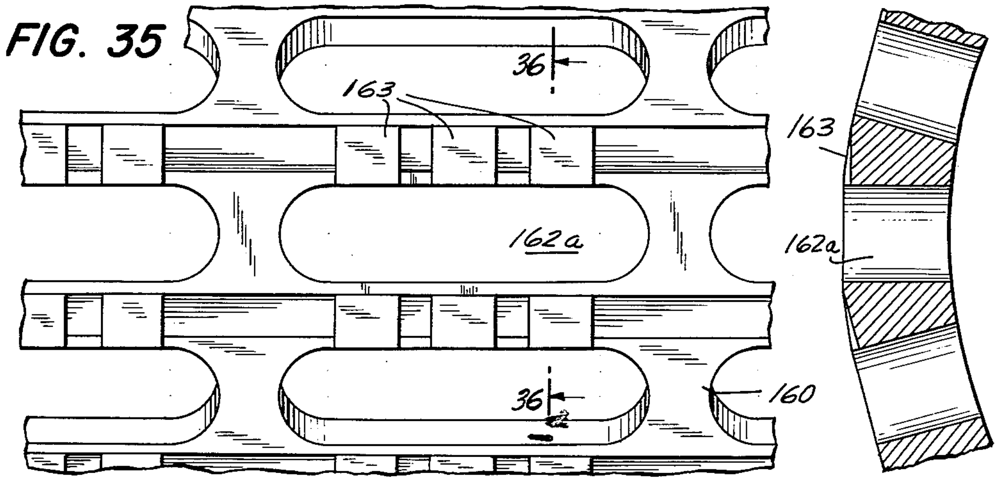
FIG. 35 is a fragmentary enlarged plan view of one typical drum surface formation showing the slots, recesses and flats contributing to the reliable operation of the invention and designed to produce elongated capsules.
FIG. 36 is a vertical cross section view, taken along line 36—36 of FIG. 35.
Figure 37:
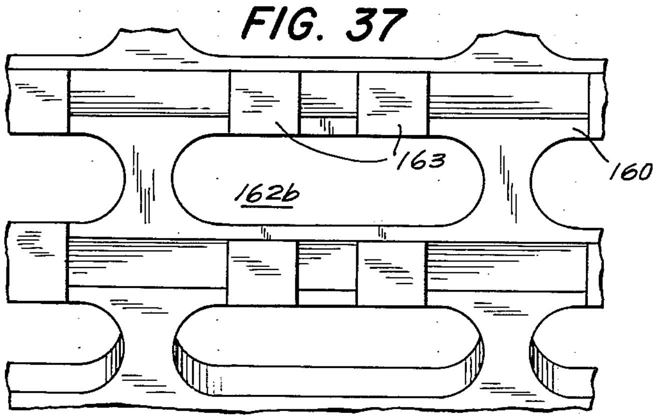
FIG. 37 is a fragmentary enlarged plan view, a modification of the die drum of the invention to provide two injector positions per capsule and showing the changes in the slots, recesses and flats to accomplish this modification.
Figure 39:
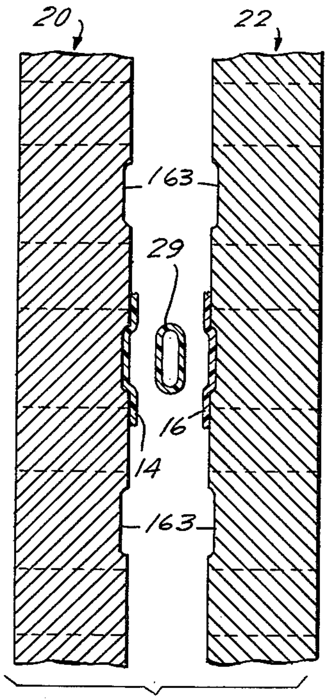
FIG. 39 is a horizontal cross sectional view taken along line 39—39 of FIG. 38.

Pump 24 includes a central body casting 270 (FIGS. 31 to 34 inclusive), having generally T-shaped front and rear end plates 272 and 274 respectively bolted or otherwise removably secured to each end. The leg of each T carries vertically extending guide slots 276 and 277 within which is slidably mounted the ends of piston slipper block 278. Pivotally mounted to the slipper block 278 at the front and rear ends thereof, are connecting rods 280 and 282, respectively. These are connected to crank arms 281, 283 respectively, carried by crank shaft 285. Thus as crank shaft 285 is oscillated, the slipper block 278 is reciprocated vertically carrying with it a number of piston rods 286 each of which is received in an individual cylinder 288 in pump body block 270. Each piston is sealed in its respective cylinder 288 by conventional pump packing gland 290. Each cylinder 288 is connected to a valve chamber 296 by a transfer port 292. Further passageways are drilled in the pump body block 270, inlet passage 293 connecting valve chamber 296 to the fluid distributor chamber 295 and discharge passage 294 connecting valve chamber 296 to the individual pipes 28 on which the fluid filling nozzles 29 (FIG. 9) are connected. Valves 296 are generally cylindrical bodies having passageways 297 which, as valves 296 are oscillated, alternately connect the fluid supply 295 to cylinder 288 or connects the discharge channel 294 to the cylinder 288. Thus, as piston 286 is drawn downwardly, valve 296 is in its most counterclockwise position as shown on the left side of FIG. 34, and the atmospheric pressure on the fluid supply causes fluid to be drawn into the cylinder. As valve 296 is rotated to its most clockwise position and the piston 286 reverses its stroke, the fluid will be delivered under pressure to nozzles 29, for filling the capsules. Since the pressure required to fill the capsules is rather high, leakage between the seats of the valve chambers 296 and the transfer ports could conceivably take place. This is prevented by providing valve seal lock members 298 mounted in a series of guide blocks 291 and each having a wedge surface 300 adapted to be pressed firmly against valve 296 by spring 301. Thus leakage is positively prevented. The top end of lock member 298 is adapted to cooperate with cam 303. Cam 303 is generally cylindrical, but has a flat sector 302 on its periphery. When flat sector 302 is presented to lock member 298, the valve body is pressed against the valve ports by spring 301 coacting with wedge surface 300. Rotation of cam 303 so that the cylindrical surface of the cam engages the end of lock member 298, compresses spring 301 and relieves the pressure of the wedge face 300 against the valve body 296. Cams 303 are carried on cam shafts 304 journalled on the right and left arms of the T-shaped end plates by front bearings 306 and rear bearings 307 respectively. Cam shafts 304 are each provided at their rear ends with a transversely extending key slot 308 adapted to couple with extending keys on shafts 310 and 312 which are journalled in bearing plates 170 and 171 (see FIG. 10) and are coupled to actuating means within the forming and filling mechanism 18. Valves 296 for the right and left hand sides of the pump are also provided with key slots transversely of rear ends thereof, adapted to be coupled to valve drive shafts 314 and 316 respectively. Coupling keys 311, 313, 315, 317 inclusive, carried by drive shaft 310, 312, 314 and 316 respectively, are so keyed to the shafts that they will not turn on the shafts but are free for longitudinal movement along the shaft ends and are spring pressed towards the front of the machine so that they engage with the key slots in their respective driven shafts for positive rotation thereof. A similar quickly removable coupling 318 (see also FIGS. 18 and 19) is provided with and between pump crank shaft 285 and its drive shaft 319 so that the whole pump mechanism may be readily removed as a unit. Coupling 318 has a pair of extending pins 309 adapted to enter holes 309[1] on crank 283 to drive crank shaft 235. When mounted, pump 24 is secured to front mounting plate 170 in appropriate aligned relationship with its operating shafts by mounting rails 320 and 322 being received in mounting holes, 321 and 323, respectively in back end plate 274 and mounting holes 324 and 325 in front end plate 272. The pump is held in place by combined threaded studs and locating pins 326 and 327 mounted on front mounting plate 170 and engaging with mounting holes 328, 329 in end plate 274.

Figure 12:
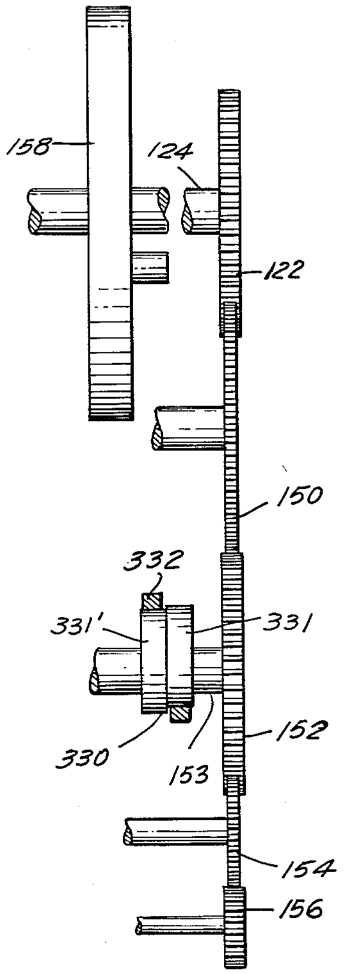
FIG. 12 is a fragmentary side elevation view of an intermediate area of the gear system showing the main continuous drive from the motor driven gears through to the main cam shaft drive.
Figure 13:
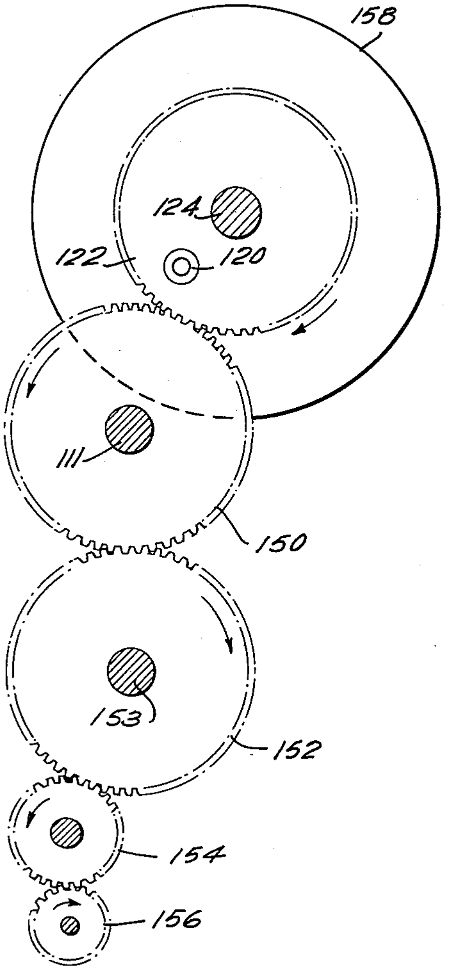
FIG. 13 is a fragmentary front elevation of the gear train of FIG. 12.
Figure 19:
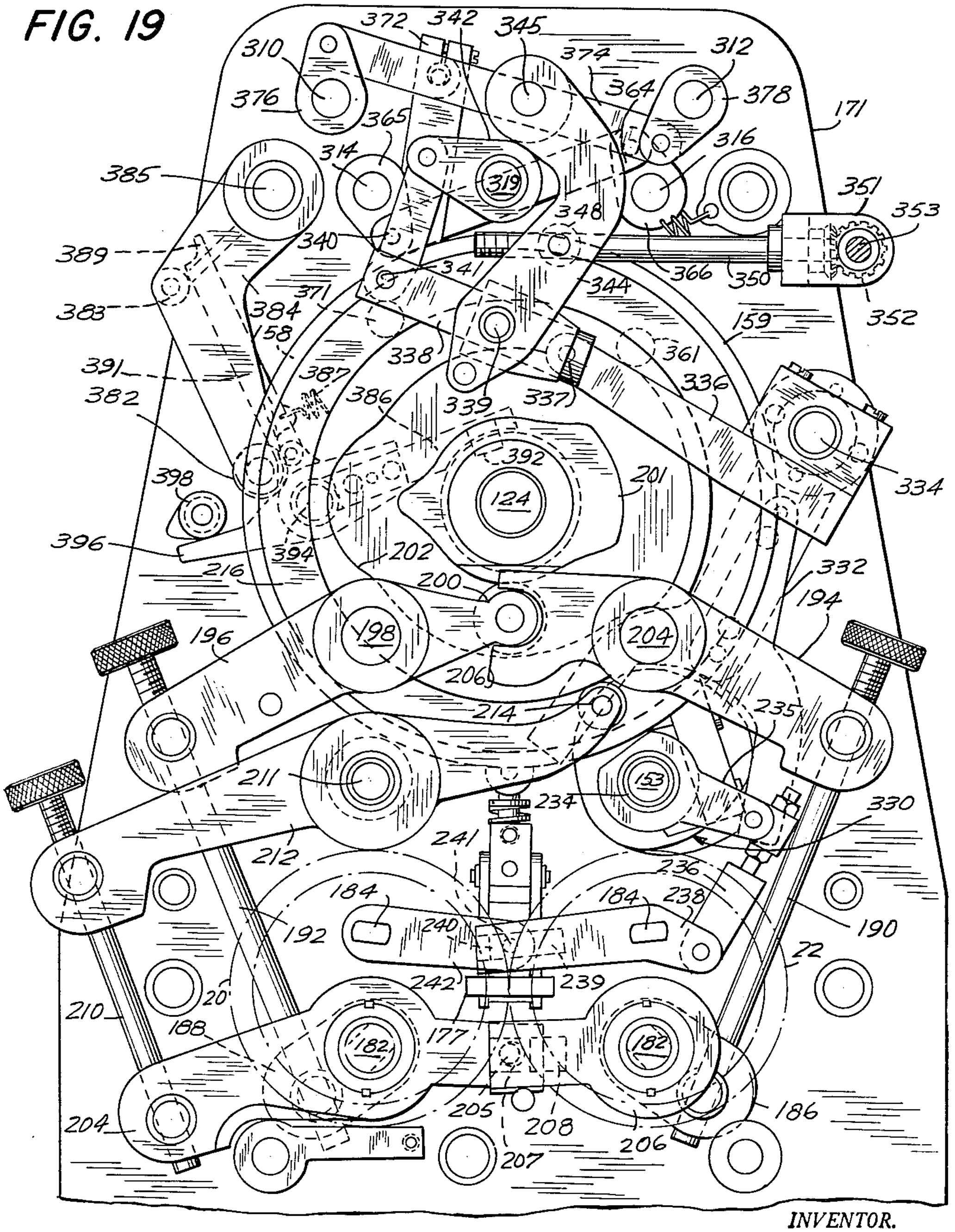
FIG. 19 is a vertical section view of the machine taken along line 19—19 of FIG. 18 and from the front of the machine showing details of the cam drive assemblies.
Figure 46:
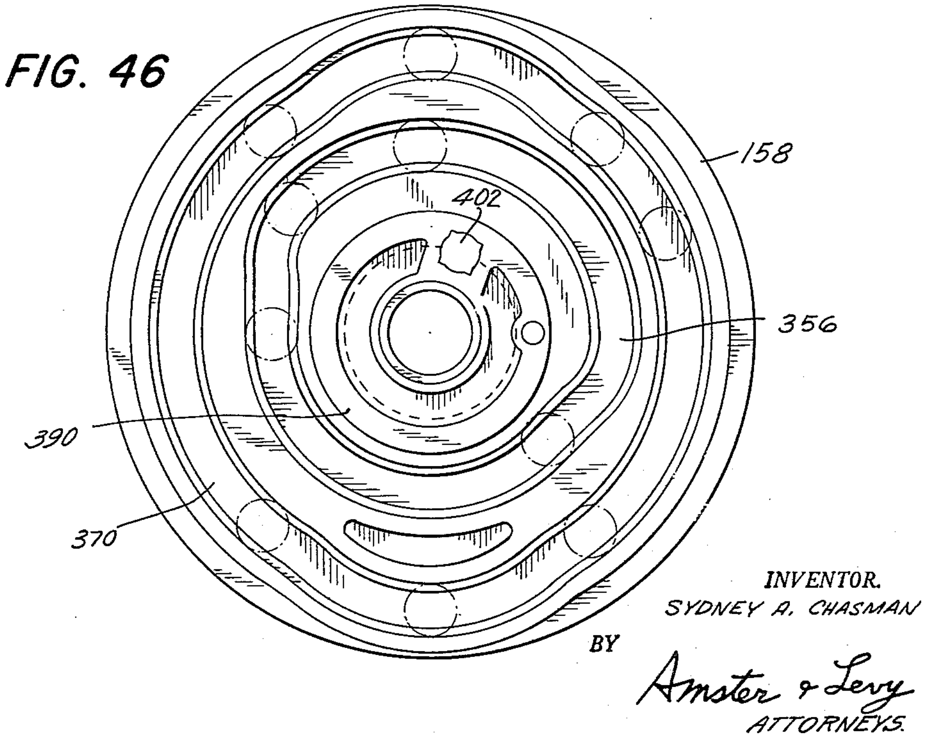
FIG. 46 is a rear face view of the second, pump control cam taken in the direction of line 46—46 of FIG. 41.

Pump 24 is continuously operated during the entire time that the machine is in operation by the mechanism now to be described. Intermediate wheel 152 (FIG. 12) is carried on an intermediate shaft 153 coaxial with shaft 234. Shaft 153 also bears a pump cam assembly 330 (FIG. 19). Pump cam assembly 330 is embraced by the arms of an eccentric follower fork 332 clamped to pump shaft 334. Pump cam 330 could conveniently be a single disc eccentrically mounted on shaft 153 and embraced by fork 332. This would result in substantially uniform motion of the pump pistons driven thereby. However, to avoid pumping action while transferring valve 296 between inlet and outlet positions, it is preferred to flatten the pressure curve 8 (FIG. 40) in the 45°–90° and 225°–270° segments and shorten the intervening suction and discharge strokes. In order to attain this result cam 330 is actually formed as two offset cams 331, 331[1] and follower fork 332 has its arms offset so that one follows cam 331 and the other 331[1]. Appropriate contouring of the cam faces provides for the shortened suction and delivery strokes and the longer dwells at the ends thereof. The shaft 334 also carries, rigidly secured to it, arm 336 extending approximately at right angles to the length of the follower fork 332. The far end of arm 336 is pivotally secured to one end of lever 338 by pin 337. Lever 338 swings about movable pivot 339 slidable along the length of lever 338. The end of lever 338 is swingably coupled to link 340 by means of a pin 341 and link 340 is coupled to crank arm 342 carried by operating shaft 319. Thus as the cam 330 rotates, the cam follower fork 332 is oscillated back and forth through an arc determined by the degree of eccentricity of cam 330 and the pump operating shaft 319 is consequently oscillated. The particular angle of oscillation of pump operating shaft 319 is determined by the relative position of movable pivot 339 along the length of lever 338. Pin 339 is supported in journals on a pivot support carriage 344, journalled on axle 345 and carrying at an intermediate point between its ends a pivot adjusting nut 348. Axle 345 for pivot support carriage 344 is supported forwardly of the front mounting plate 170 (see FIG. 18). Nut 348 is threaded onto lead screw 350 mounted in bearing block 351 and coupled by a bevelled gear pair 352 to further shaft 353 which carries an adjusting knurled knob 354 (FIGS. 9 and 10). As knob 354 is rotated, nut 348 can be caused to progress along lead screw 350 in one direction or the other. This action effectively shifts movable pivot 339 along the length of lever 338. It should be noted that the construction permits such shifting without stopping the operation of the pump. Thus the effective length of pump stroke is varied as desired to adjust the amount of fluid charge delivered to the nozzles into the capsules being formed, the valves of pump 24 being operated in appropriate timed relationship so that the fluid charge is delivered to the nozzles. Pump valves 296 are however not continuously operated as the pump pistons are operated, but are driven by a separate drive means which can be coupled and uncoupled from the remainder of the drive so as to selectively cause the pump to either deliver the charge to the capsules or, in the event the pump valve operating mechanism is disconnected so that the pump valves 296 are in the position shown in FIG. 34, the fluid contained within reservoir 294 will merely be circulated into and out of the cylinder cavity in which pistons 286 operate. This has the function of keeping the fluid continuously stirred up during times when fluid charges are not being delivered to the forming capsules. Pump valves 291 are operated in timed relationship to the operation of the pump pistons by cam 158 when it is clutched to gear 122 adjacent thereto on shaft 124 on which both are mounted. Cam 158 carries on its rear face a shrouded cam track 356 (FIGS. 8, 41 and 46) in which rides cam follower finger 358 carried by cam follower arm 360, journalled on shaft 361. Cam follower arm 360 carries extension arm 362 coupled to link 364 at a point intermediate its ends. The ends of link 364 are pivotally coupled to cranks 365 and 366 mounted on shafts 315 and 316 respectively. Thus as cam 158 rotates, cam follower arm 360 is oscillated back and forth and this oscillatory motion is carried by link 364 and cranks 365 and 366 to shafts 315 and 316. The latter shafts are directly coupled to the ends of valves 291 so that the valves are oscillated from a position in which the receding pistons draw fluid from fluid reservoir chamber 295 to a position where rising piston 286 delivers a measured charge of fluid to the capsule being formed. Pivotally mounted on shaft 371 for separate rotation thereon is a second cam follower arm 368, having a cam follower finger 369 riding in valve lock operating groove 370 likewise on the rear face of cam 158. Cam follower 368 has an extension arm 372 extending upwardly from shaft 371 and coupled at its top end to crank 376. Cranks 376 and 378 are mounted on valve lock operating shafts 310 and 312 respectively, and coupled together by link 374. Thus, as cam 158 rotates while in coupled relationship with gear 122, shafts 310 and 312 are rocked as dictated by the profile of cam track 370 and the valve lock cams 303 are alternately rotated from positions in which the valve lock members 298 are free from contact with valves 296 and to positions wherein spring 301 causes the valve locks 298 to bear against valves 296 and lock them so as to prevent leakage between the valve passages and the valve face. The relative timing of these operations is illustrated in the cam time chart. Curve 8 shows that pump piston stroke is continuous having its delivery strokes running from 90° to 225° along the length of the chart whereas the suction stroke runs from 270° to 45° therealong. It will be noted from curve 5, the pump valve transfer diagram, that the position of the pump valve 296 is shifted from intake to delivery positions during the time intervals of 45° to 90° and from 225° to 270°.

During the same two periods of pump valve transfer operation, the pump valve lock (curve 6) is operated to release the pump valve for easy rotation. During the remainder of the cycle the pump valve lock cam 303 in its normal position of rest wherein flat face 302 faces the end of pump valve lock plungers 298 so that wedges 300 bear against pump valve 296 to maintain the pump valve against leakage.

Figures 41, 42:
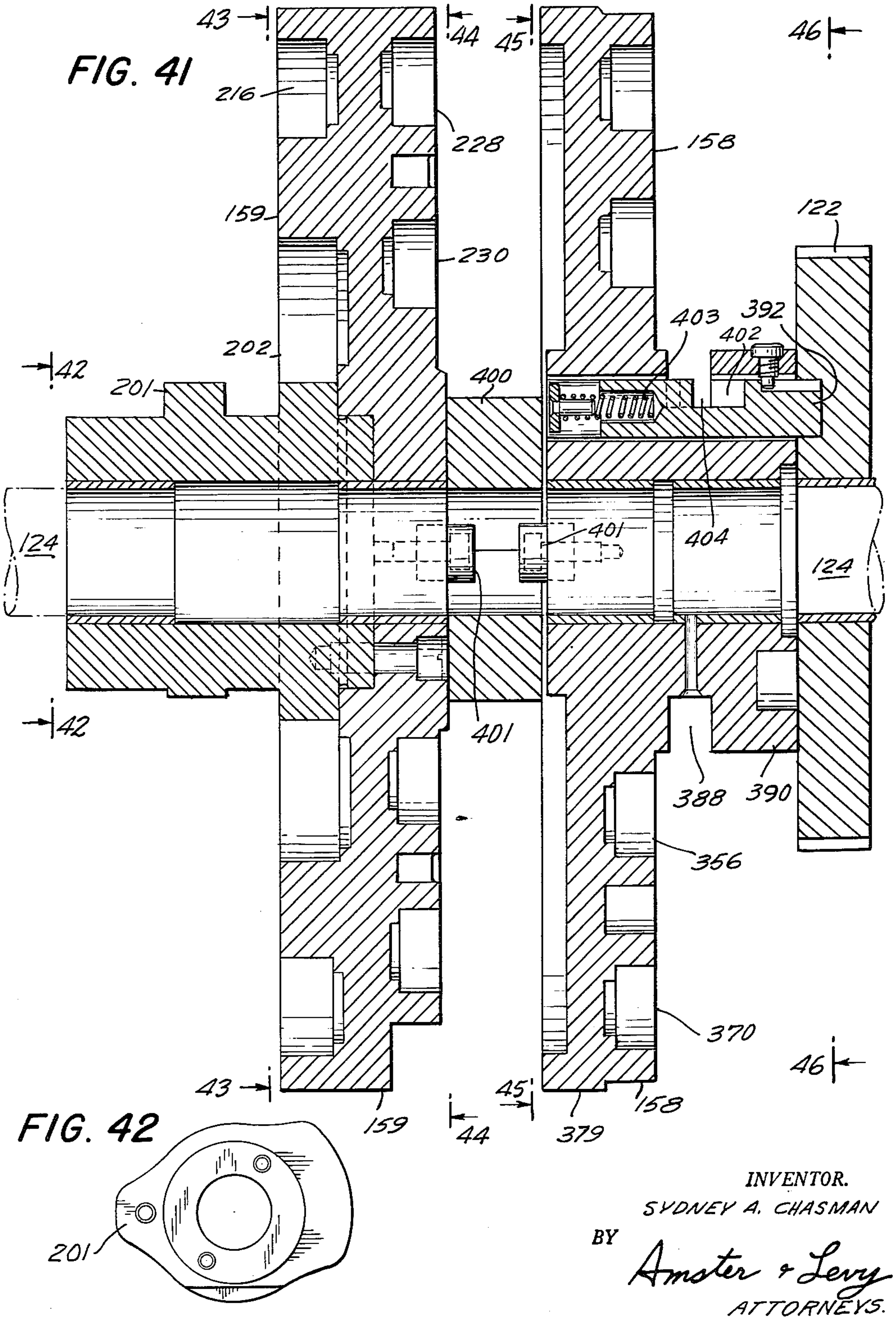
FIG. 41 is a vertical cross section view, taken along line 41—41 of FIG. 10 showing further details of the cylinder drive and pump cams.
FIG. 42 is a further view of the combined face and hub for the punch operation, taken along line 42—42 of FIG. 41.
Figure 43:
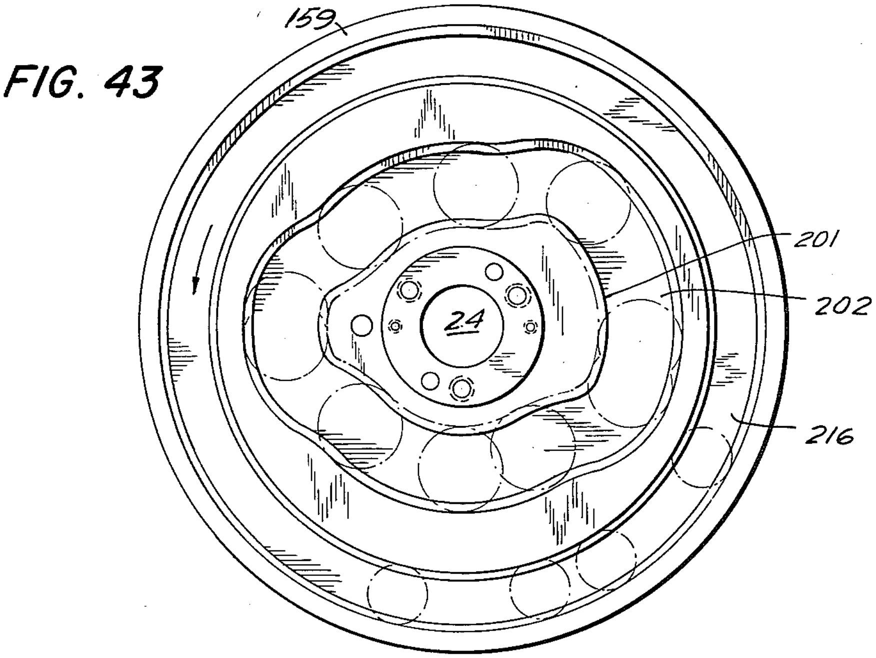
FIG. 43 is a front face view of the first, encapsulating cam taken in the direction of line 43—43 of FIG. 41.
Figure 44:
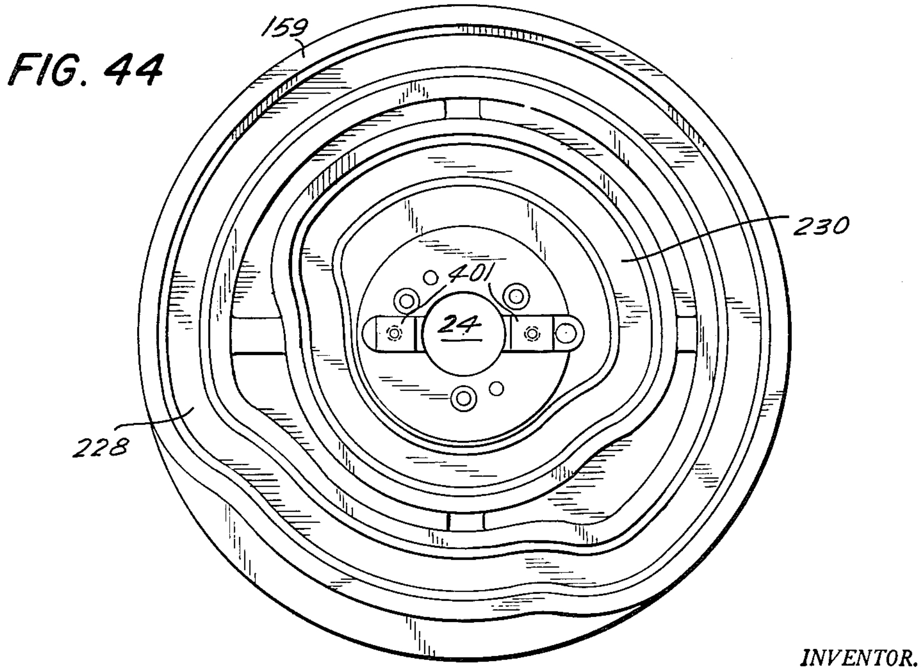
FIG. 44 is a rear face view of the first, encapsulating cam taken in the direction of line 44—44 of FIG. 41.
Figure 45:
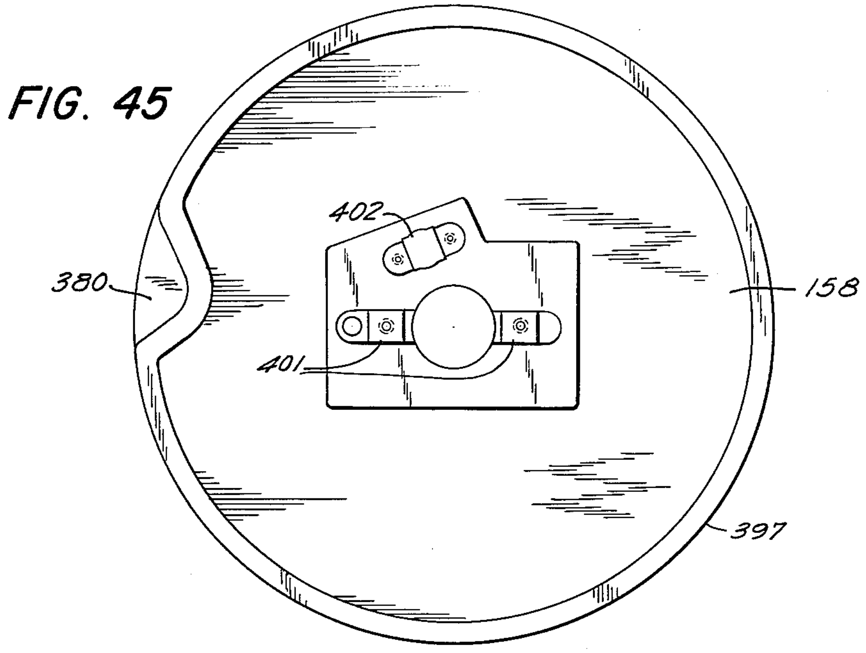
FIG. 45 is a front face view of the second, pump control cam taken in the direction of line 45—45 of FIG. 41.

It has earlier been pointed out that whereas the cylinder indexing, gelatin ribbon supply and pump piston operation is continuous throughout the operation of the machine, the operation of the pump valves, the oscillation of the cylinders and the operation of the punches and plungers may be discontinued as desired. Such disconnection and subsequent recoupling of the drive must however take place at an accurately predetermined time during the cycle of operation. This time is at the 0° point on the cam chart of FIGURE 40. At that time the cylinders are in their most separated position, the locking plate 177 is disengaged, the forming punches, air plungers and "kickers" are retracted and the pump valve is in a position wherein the pump cylinders are connected to the fluid reservoir. As best shown in FIGURE 41, cams 158, 159 are journalled on shaft 124 which also rotatably receives gear 122.

Shaft 124 is arranged so that it may be slipped longitudinally out of the frame thus freeing cams 158, 159 and gear wheel 122 for removal when desired. Cams 158, 159 are contrained to move together by coupling block 400 which entirely fills the axial space between the two cams and has holes in each face, receiving coupling keys 401 extending from the adjacent faces of cams 158, 159 adjacent their central bores.

Cam 158 has a central hub 390 provided with an annular groove 388. Hub 390 is also provided with a rectangular key hole 402 parallel to the axis of the cam and intersecting annular groove 388. Carried in key hole 402 is a key 392 urged by spring 403 toward the right in FIGURE 41 so that key 392 engages with a recess in gear 122. When so coupled both cams and the gear rotate together while the movement of key 392 to the left disengages the cams from gear 122. Key 392 is provided with an outwardly facing notch 404 in offset relationship with annular groove 388.

The aforementioned withdrawal of key 392 from gear 122 is provided by clutch finger 386 (FIG. 19) which can be caused to ride in groove 388 when desired. In such position it rides into notch 404 in key 392 and moves the key to the left.

Cam 158 is provided with an exterior cam track 379 having a depression 380 at one point along its periphery. Roller cam follower 382 carried by follower arm 384 pivoted on shaft 385 rides on cam track 379. Cam follower arm 384 is resiliently pressed toward cam 158 by spring 387 attached to cam follower arm 384 (as shown in FIG. 19) and to a convenient fixed anchorage.

Figure 8:
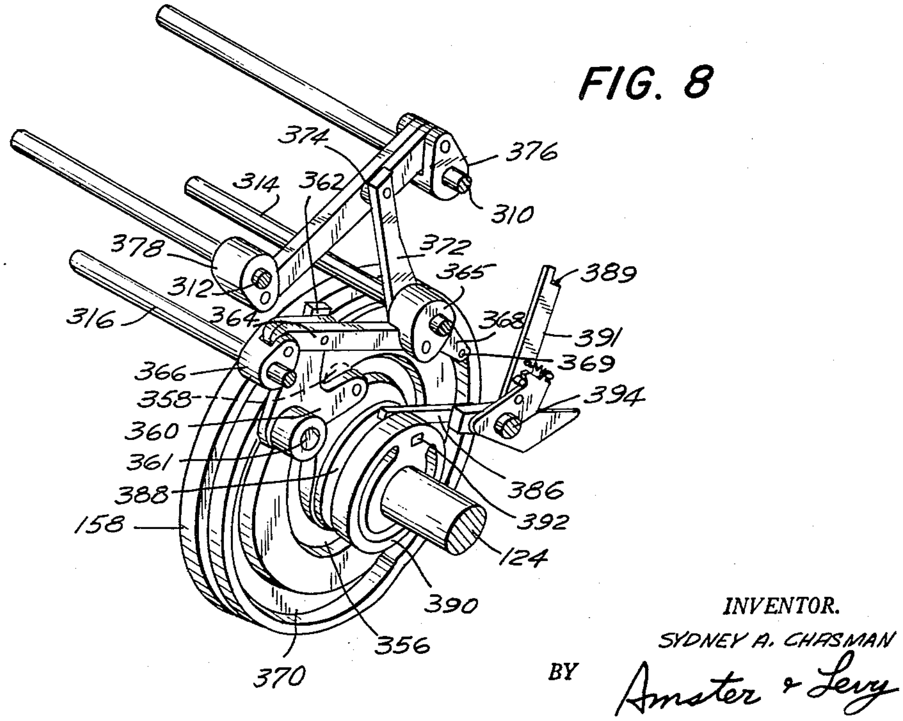
FIG. 8 is a perspective rear face view of the cam shown in FIG. 6.

Clutch finger 386 is rotatably mounted on shaft 394 and when it is rotated into the position as shown in FIG. 8 where it rides in groove 388, at one point in the revolution of the cam, it forces key 392 to the left (FIG. 41) and disengages the drive. At the same time roller 382 drops into notch 380 assisting in the final withdrawal of key 392 and holding cams 158, 159 stationary in their arrested positions.

When it is desired to have the cams driven continuously clutch control cam 398 (FIG. 19) is manually rotated to bear against rearwardly extending arm 396 thus raising clutch finger 386 out of groove 388. As soon as gear 122 completes a revolution so that key 392 can drop into the recess in gear 122 it does so under the influence of spring 403 and the cams are again driven in their proper timed relationship with the remainder of the mechanism.

The rotation of clutch finger 386 in a counterclockwise direction (FIG. 19) causes lever 391 to be biased to the left so that as cam arm 384 rides up onto the raised portion of cam track 379 gear 389 drops under pin 383. This supports cam arm 384 in an outward position so that cam roller 382 does not drop into depression 380 and cause a cyclic interruption of the uniform cam rotation during normal operation.

Figure 47:
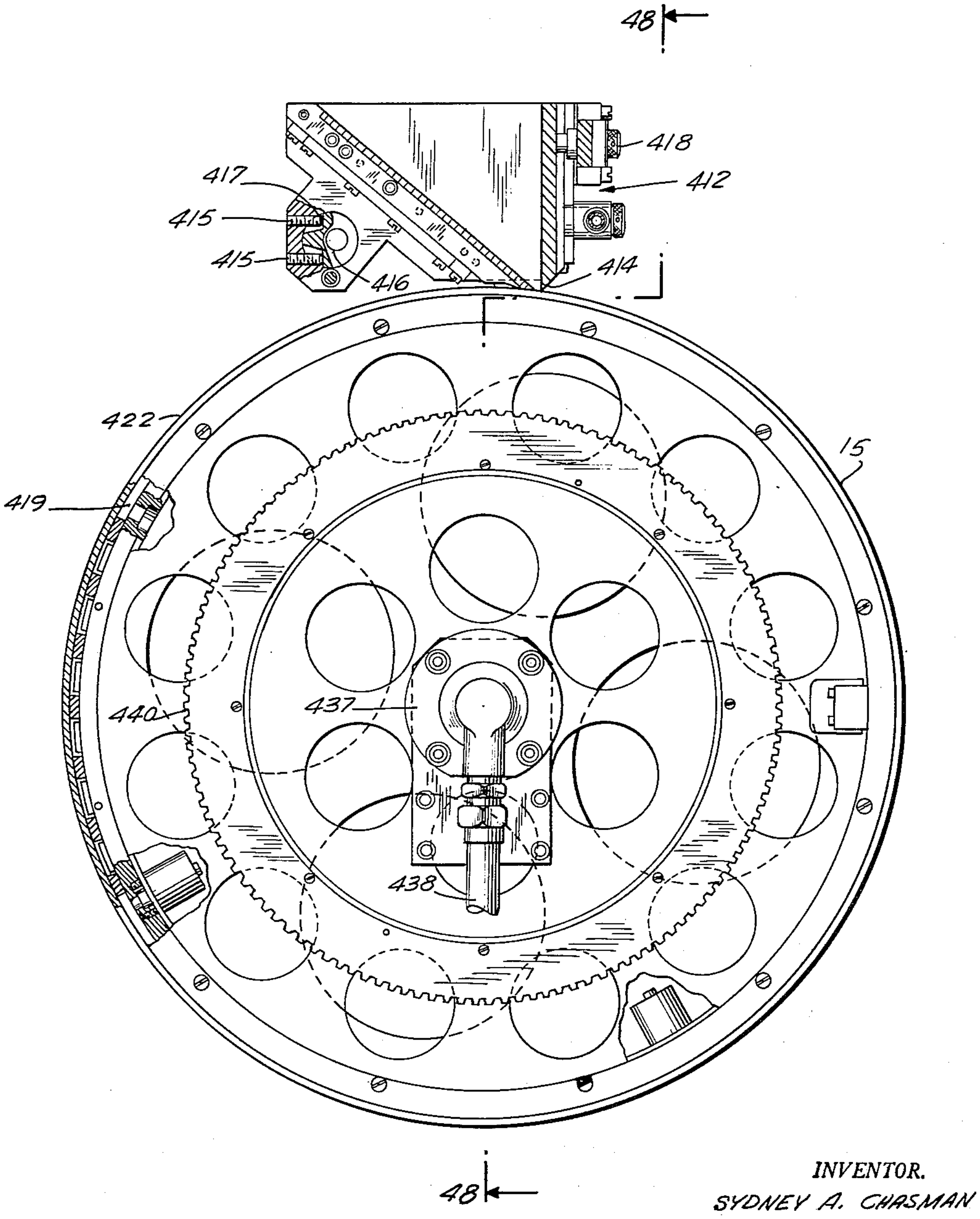
FIG. 47 is a view taken along line 47—47 partially in section of FIG. 2 showing the rear of the left film forming drum in elevation with water inlet and outlet pipes and with the film spreader box in section.

It was mentioned earlier in passing that the gelatin films are produced from heated liquid gelatin contained in a supply container 11 and 13. Gelatin flows through tube 410 (FIG. 1) into spreader box 412 wherein the level is maintained at some predetermined level by a float valve (not shown) or similar regulating means. The walls of spreader box 412 are provided with passageways and water is circulated therethrough to maintain the desired temperature. Spreader box 412 is mounted closely adjacent the surface of drum 15 and has a narrow slot at the bottom bounded at one side with a doctor blade 414 (FIG. 47) which assures a constant thickness of gelatin being spread over the entire length of drum 15 as it rotates. The spreader box is mounted on support rod 416 and its orientation relative to drum 15 can be adjusted by manipulation of screws 415 bearing against notches 417 in rod 416. Also either end of doctor blades 414 may be independently raised and lowered by cam screws 418 to thus assure absolute parallelism of the edge of the doctor blade with the surface of drum 15. In this way it is possible to obtain a continuous sheet of gelatin with uniform thickness from edge to edge. Drum 15 has a continuous somewhat helical water passage in its rim to control the temperature of the drum.

Figure 48:
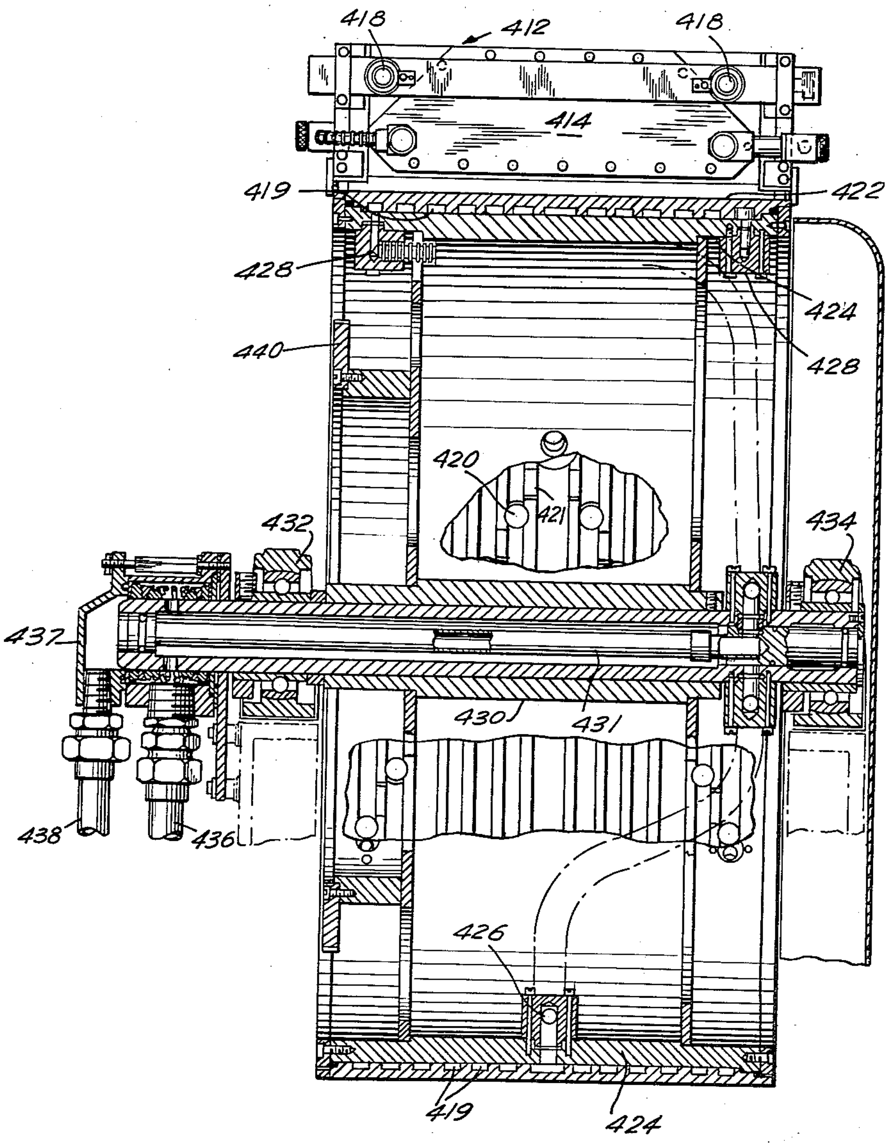
FIG. 48 is a vertical section view taken along line 48—48 of FIG. 47 showing interior details of the drum and film spreader.

As shown in FIG. 48, a convenient way of providing the water passages is to machine a series of circumferential grooves 419 on the inner surface of the rim 422 of the drum and at selected points along their length, insert plugs 420 and cut lateral passages 421. Thereafter inner rim 424 is secured within rim 422 and proper connections made to the central groove 419 as shown at 426 and at the outer grooves as at 428. Thus fluid will flow from 426 in central groove 419 substantially completely around the circumference of rim 422 until it meets a plug 420 whereupon it will divide and flow through both of the next adjacent grooves as required by the presence of plugs 420 in those passages. Upon arriving at the other side of plugs 420, the fluid will pass through further lateral passages 421 into the next adjacent grooves, finally being drained off at pipe connections 428.

Figure 3B:
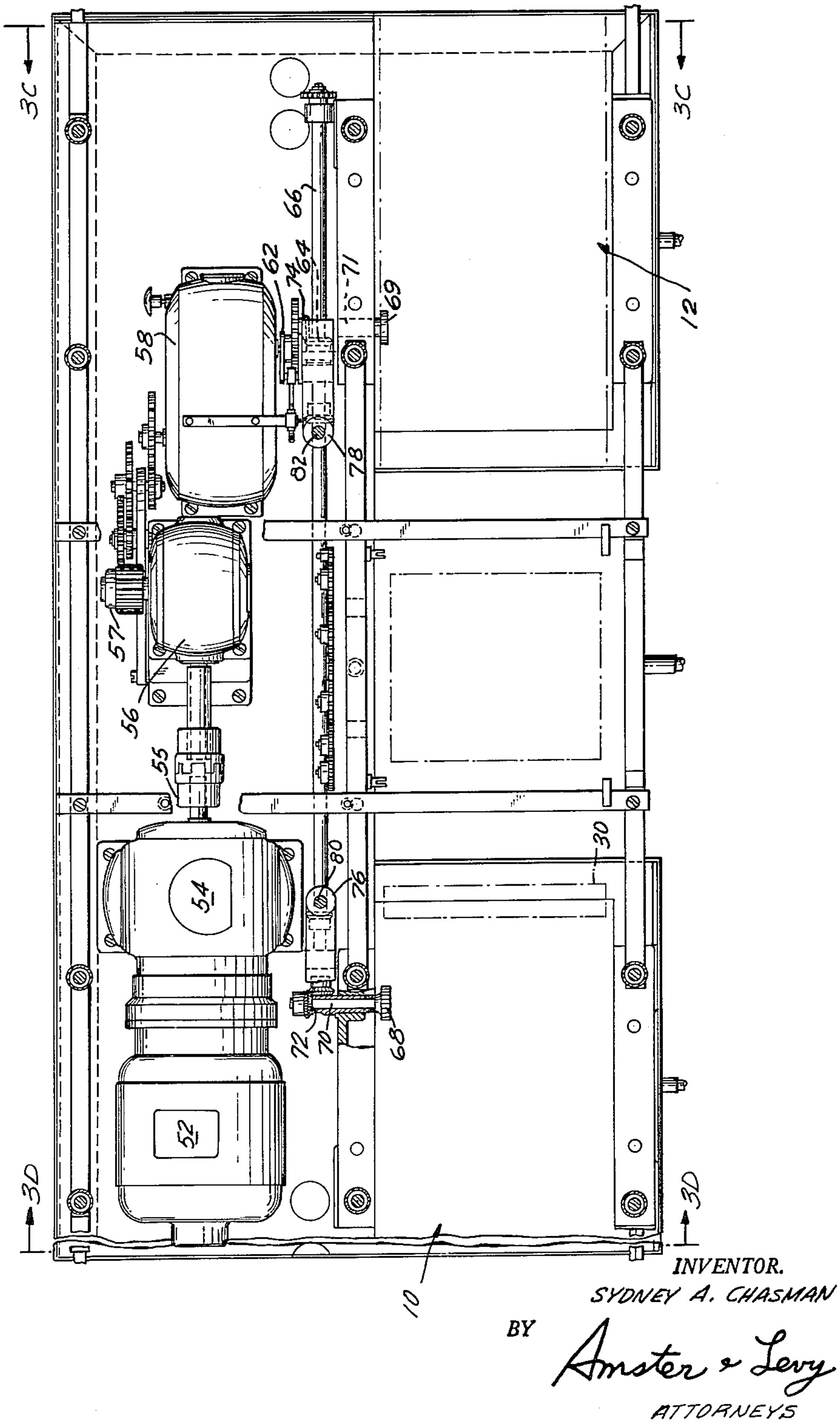
FIG. 3B is a horizontal section taken substantially along line 3B—3B of FIG. 3A.
Figure 3D:
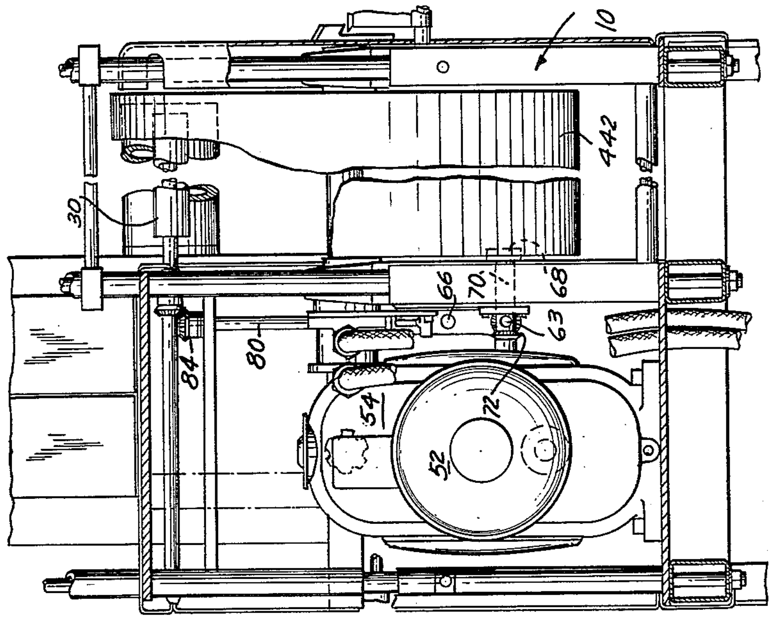
FIG. 3D is a left hand sectional view taken along line 3D—3D of FIG. 3B.
Figure 3C:
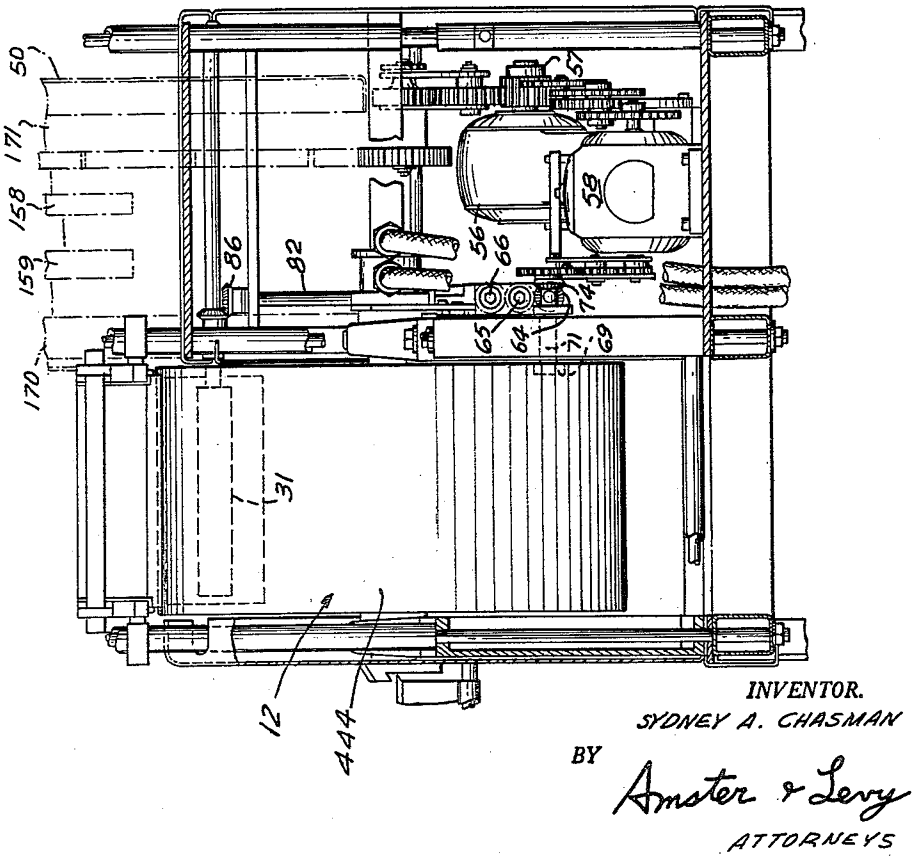
FIG. 3C is a right hand sectional view taken along line 3C—3C of FIG. 3B.

Drums 15 are carried by a double hollow shaft 430, 431 journalled for rotation in journals 432, 434. Inner hollow shaft 431 is connected by piping to water outlets 428 and outer shaft 430 to water inlet 426 at the front end. Shafts 430, 431 are coupled to inlet and outlet water piping 436, 438 by rotary shaft seals 437. Drum 15 carries at its rear end a concentric ring gear 440 adapted to couple to driving pinion 68 (FIG. 3*b*).

Drum 17 is in all respects similar to drum 15 just described and will not be separately described except to say that its ring gear couples to pinion 69 (FIG. 3B) and that it rotates in the opposite direction to drum 15.

Now as drum 15 rotates and a thin uniform film of liquid gelatin is spread on its surface, the temperature is adjusted to cause the gelatin to "set" on the drum. Air hoods 442 and 444 (FIG. 1) surround substantially the major portion of the periphery of drums 15 and 17, and direct warm dry air supplied by motor driven drum blowers 446, 448 against the film to further set and dry the film as the drums rotate. Thus, when the films reach a point where they are to be stripped off by stripping rolls 30, 31 they are tenacious enough to withstand this action without tearing or stretching excessively.

While most of the foregoing description has been predicated upon the assumption that spherical capsules are to be formed, it is also contemplated that elongated ellipsoidal or cylindrical capsules may be produced. In this event cylinders 20, 22 are provided with elongated apertures **162*a* and 162*b* (FIGS. 35, 36 and 37) in the flat faces 160** thereof.

In order to expedite the filling of such large capsules two or three nozzles per aperture may be needed, and a corresponding number of clearance notches 163 are provided.

In this arrangement it is also possible to supply two or three different constituents for filling each capsule, the separate constituents only coming together within the capsule. Separate fluid supply reservoir 26 and appropriate manifolding of reservoir 294 is then required, but this can readily be accomplished.

While I have particularly described an embodiment of the present invention it should be clearly understood that my invention is not limited thereto but variations within the scope of the appended claims may be made.

What I claim is:

1. A capsule-forming machine comprising a pair of hollow multi-facetted cylinders adapted to be indexed in a step-by-step operation so that successive flat faces are presented in a face-to-face relationship, each of said faces having a number of apertures formed therein aligned longitudinally along the center of each face, means for feeding a pair of plastic films in opposed face-to-face relationship between said cylinders, means for causing said cylinders to be moved laterally until said faces are in abutting relationship, whereby defined opposed areas in each of said sheets are captured, plungers within each of said cylinders in alignment with each of the apertures in opposed faces and including opposed contact faces substantially coextensive with the opposed apertures, means for moving said contact faces of said plungers into mutually opposed pressing relationship with said sheets to express air which may be entrapped in the captured areas outlined by opposed apertures in said faces, means for retracting said plungers, means for introducing, under pressure, within each of the captured areas, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other into abutting face-to-face relationship on opposite sides of said sheets, said last-mentioned means serving to seal together peripheral zones of each of said captured areas and to substantially sever them from contiguous portions of said sheets to thereby form sealed globular capsules entirely filled with said fluid.

2. A capsule-forming machine comprising a pair of hollow multi-facetted cylinders arranged along parallel axes adjacent one another, said cylinders being adapted to be indexed in a step-by-step operation so that successive flat faces are presented one to the other in a face-to-face relationship, each of said faces having a number of apertures formed therein aligned longitudinally along the center of each face, means for feeding a pair of plastic films in opposed face-to-face relationship between said cylinders, means for moving said cylinders laterally to bring said faces into and out of abutting relationship, said faces, when in abutting relationship holding sections of said films in fluid tight contact around said apertures, plungers within each of said cylinders in alignment with each of the apertures in opposed faces and including opposed contact faces substantially coextensive with the opposed apertures, means for moving said contact faces of said plungers into mutually opposed pressing relationship with said sheets to express air which may be entrapped in the areas outlined by opposed apertures in said faces, means for retracting said plungers, means for introducing, under pressure, within each of the areas outlined by each pair of opposed apertures, a measured amount of fluid under pressure whereby said areas of said opposed sheets are inflated into opposed semi-globular areas entirely filled with said fluid, hollow die punches coaxial with said plungers and individual to each pair of opposed apertures, and means for forcing said die punches toward each other into abutting face-to-face relationship on opposite sides of said sheets, said last mentioned means serving to seal together peripheral zones of each of said captured areas and to substantially sever them from contiguous portions of said sheets to thereby form sealed globular capsules entirely filled with said fluid.

3. A capsule-forming machine comprising means for feeding a pair of plastic films in opposed face-to-face relationship between a pair of flat pressure faces each having a number of apertures in a row along said plates transverse to the length of said films, means moving said faces into abutting relationship, whereby defined opposed areas in each of said sheets are captured, plungers in alignment with each of the apertures in said faces and including opposed contact faces substantially coextensive with the opposed apertures, means for moving said contact faces of said plungers into mutually opposed pressing relationship with said sheets to express air which may be entrapped in the captured areas outline by opposed apertures in said faces, means for retracting said plungers, means for introducing, under pressure, within each of said captured areas, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other into abutting face-to-face relationship on opposite sides of said sheets, to seal together peripheral zones of each of said captured areas and to substantially sever them from contiguous portions of said sheets to thereby form sealed globular capsules entirely filled with said fluid.

4. A capsule-forming machine comprising a pair of hollow multi-facetted cylinders adapted to be indexed in a step-by-step operation so that successive flat faces are presented in a face-to-face relationship, each of said faces having a number of apertures formed therein aligned longitudinally along the center of each face, means for feeding a pair of plastic films in opposed face-to-face relationship between said cylinders, means for causing said cylinders to be moved laterally until said faces are in abutting relationship, whereby defined opposed areas in each of said sheets are captured, plungers within each of said drums in alignment with each of the apertures in opposed faces and including opposed contact faces substantially coextensive with the opposed apertures, means for moving said contact faces of said plungers into mutually opposed pressing relationship with said sheets to express air which may be entrapped in the captured areas outlined by opposed apertures in said faces, means for retracting said plungers, means for introducing, under pressure, within each of the captured areas outlined by each pair of opposed apertures, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other into abutting face-to-face relationship on opposite sides of said sheets, said last-mentioned means serving to seal together peripheral zones of each of said captured areas and to substantially sever them from contiguous portions of said sheets to thereby form sealed globular capsules entirely filled with said fluid, said means for introducing fluid including a number of hollow nozzles supported from a manifold bar mounted along a plane passing through said faces which are in face-to-face relationship, a source of fluid and a pump operated in timed relationship to the operation of said punches for forcing fluid from said supply into the spaces defined by said captured areas.

5. A capsule-forming machine comprising a pair of hollow multi-facetted cylinders adapted to be indexed in a step-by-step operation so that successive flat faces are presented in a face-to-face relationship, each of said faces having a number of apertures formed therein aligned longitudinally along the center of each face, means for feeding a pair of plastic films in opposed face-to-face relationship between said cylinders, means for causing said cylinders to be moved laterally until said faces are in abutting relationship, whereby defined opposed areas in each of said sheets are captured, plungers within each of said cylinders in alignment with each of the apertures in opposed faces and including opposed contact faces substantially coextensive with the opposed apertures, means for moving said contact faces of said plungers into mutually opposed pressing relationship with said sheets to express air which may be entrapped in the captured areas outlined by opposed apertures in said faces, means for retracting said plungers, means for introducing, under pressure, within each of the captured areas outlined by each pair of opposed apertures, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other into abutting face-to-face relationship on opposite sides of said sheets, said last-mentioned means serving to seal together peripheral zones of each of said captured areas and to substantially sever them for contiguous portions of said sheets to thereby form sealed globular capsules entirely filled with said fluid, said means for introducing fluid including a number of hollow nozzles supported from a manifold bar mounted along a plane passing through said faces which are in face-to-face relationship, said nozzles extending between said sheets into the zone of said captured areas, a source of fluid and a pump operated in timed relationship to the operation of said punches for forcing fluid from said supply into the spaces defined by said captured areas.

6. A capsule-forming machine comprising a pair of hollow multi-facetted cylinders adapted to be indexed in a step-by-step operation so that successive flat faces are presented in a face-to-face relationship, each of said faces having a number of apertures formed therein aligned longitudinally along the center of each face, means for feeding a pair of plastic films in opposed face-to-face relationship between said cylinders, means for causing said cylinders to be moved laterally until said faces are in abutting relationship, whereby defined opposed areas in each of said sheets are captured, plungers within each of said cylinders in alignment with each of the apertures in opposed faces and including opposed contact faces substantially coextensive with the opposed apertures, means for moving said contact faces of said plungers into mutually opposed pressing relationship with said sheets to express air which may be entrapped in the captured areas outlined by opposed apertures in said faces, means for retracting said plungers, means for introducing, under pressure, within each of the captured areas, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other into abutting face-to-face relationship on opposite sides of said sheets, said last-mentioned means serving to seal together peripheral zones of each of said captured areas and to substantially sever them from contiguous portions of said sheets to thereby form sealed globular capsules entirely filled with said fluid, said means for introducing fluid including a number of hollow nozzles supported from a manifold bar mounted along a plane passing through said faces which are in face-to-face relationship, said nozzles extending between said sheets into the zone of said captured areas, a source of fluid and a pump operated in timed relationship to the operation of said plungers for forcing fluid from said supply into the spaces defined by said captured areas, each of the faces of said cylinders having relief channels from each of said apertures to an adjacent edge of said face to provide clearance for said nozzles when said drums are in face-to-face abutting relationship.

7. A capsule-forming machine comprising a pair of spaced hollow multi-facetted cylinders, means for successively simultaneously rotating said drums in a step-by-step operation so that faces are presented one to the other in a face-to-face relationship, each of said faces having a number of apertures formed therein aligned longitudinally along the length of each face, means for feeding a pair of plastic films in opposed face-to-face relationship between said cylinders, means for moving said cylinders toward one another until said faces are in abutting relationship, whereby defined opposed areas in each of said sheets are captured, plungers within each of said cylinders in alignment with each of the apertures in opposed faces and including opposed contact faces substantially coextensive with the opposed apertures, means for moving said contact faces of said plungers into mutually opposed pressing relationship against said sheets to express air which may be entrapped in the captured areas, means for retracting said plungers, means for introducing, under pressure, within each of the captured areas outlined by each pair of opposed apertures, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other into abutting face-to-face relationship on opposite sides of said sheets, to seal together peripheral zones of each of said captured areas and to substantially sever them from contiguous portions of said sheets to thereby form sealed globular capsules entirely filled with said fluid, said means for introducing fluid including a number of hollow nozzles supported from a manifold bar mounted along a plane passing through said faces which are in face-to-face relationship, a source of fluid and a pump operated in timed relationship to the operation of said plungers for forcing fluid from said supply into the spaces defined by said captured areas.

8. A capsule-forming machine comprising a pair of spaced hollow multi-facetted cylinders, means for successively simultaneously rotating said cylinders in a step-by-step operation so that faces are presented one to the other in a face-to-face relationship, each of said faces having a number of apertures formed therein aligned longitudinally along the length of each face, means for feeding a pair of plastic films in opposed face-to-face relationship between said cylinders, means for moving said cylinders toward one another until said faces are in abutting relationship whereby defined opposed areas in each of said sheets are captured, plungers within each of said cylinders in alignment with each of the apertures in opposed faces and including opposed contact faces substantially coextensive with the opposed apertures, means for moving said contact faces of said plungers into mutually opposed pressing relationship against said sheets to express air which may be entrapped in said captured areas, means for retracting said plungers, means for introducing, under pressure, within each of the captured areas outlined by each pair of opposed apertures, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other into abutting face-to-face relationship on opposite sides of said sheets, to seal together peripheral zones of each of said captured areas and to substantially sever them from contiguous portions of said sheets to thereby form sealed globular capsules entirely filled with said fluid, said means for introducing fluid including a number of nozzles supported from a manifold bar mounted along a plane passing through said faces which are in face-to-face relationship, said nozzles extending between said sheets into the zone of said captured areas, a source of fluid and a pump operated in timed relationship to the operation of said pistons for forcing fluid from said supply into the spaces defined by said captured areas.

9. A capsule-forming machine comprising a pair of spaced hollow multi-facetted cylinders, means for successively simultaneously rotating said cylinders in a step-by-step operation so that faces are presented one to the other in a face-to-face relationship, each of said faces having a number of apertures formed therein aligned longitudinally along the length of each face, means for feeding a pair of plastic films in opposed face-to-face relationship between said cylinders, means for moving said cylinders toward one another until said faces are in abutting relationship, whereby defined opposed areas in each of said sheets are captured, plungers within each of the said cylinders in alignment with each of the apertures in opposed faces and including opposed contact faces substantially coextensive with the opposed apertures, means for moving said contact faces of said plungers into mutually opposed pressing relationship against said sheets to express air which may be entrapped in the captured areas outlined by opposed apertures in said faces, means for retracting said plungers, means for introducing, under pressure, within each of the captured areas outlined by each pair of opposed apertures, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other into abutting face-to-face relationship on opposite sides of said sheets, to seal together peripheral zones of each of said captured areas and to substantially sever them from contiguous portions of said sheets to thereby form sealed globular capsules entirely filled with said fluid, said means for introducing fluid including a number of nozzles supported from a manifold bar mounted along a plane passing through said faces which are in face-to-face relationship, said nozzles extending between said sheets into the zone of said captured areas, a source of fluid and a pump operated in timed relationship to the operation of said pistons for forcing fluid form said supply into the spaces defined by said captured areas, each of the faces of said drums having relief channels from each of said apertures to an adjacent edge of said face to provide clearance for said nozzles when said drums are in face-to-face abutting relationship.

10. A capsule-forming machine comprising a pair of hollow cylinders each having a number of flat faces thereon, said flat faces extending lengthwise of said cylinders and each having a number of apertures spaced along its length, means for incrementally rotating said drums in a step-by-step operation so that successive flat faces are presented in a face-to-face relationship, means for feeding a pair of plastic films in opposed face-to-face relationship between said cylinders, means for moving said cylinders laterally until said faces are in abutting relationship, whereby opposed areas in each of said sheets are captured, plungers within each of said cylinders in alignment with each of the apertures in opposed faces and including opposed contact faces substantially coextensive with the opposed apertures, means for moving said contact faces of said plungers into mutually opposed pressing relationship with said sheets to express air which may be entrapped in the captured areas outlined by said opposed apertures in said faces, means for retracting said plungers, means for introducing, under pressure, within each of the captured areas outlined by each pair of opposed areas, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other through said apertures into abutting face-to-face relationship on opposite sides of said sheets, to seal together peripheral zones of each of said captured areas and substantially sever them from contiguous portions of said sheets to thereby form sealed globular capsules entirely filled with said fluid.

11. A capsule-forming machine comprising a pair of hollow cylinders each having a number of flat faces thereon, said flat faces extending lengthwise of said cylinders and each having a number of apertures spaced along its length, means for incrementally rotating said cylinders in a step-by-step operation so that successive flat faces are presented in a face-to-face relationship, means for feeding a pair of plastic films in opposed face-to-face relationship between said cylinders, means for moving said cylinders laterally until said faces are in abutting relationship, whereby opposed areas in each of said sheets are captured, plungers within each of said cylinders in alignment with each of the apertures in opposed faces and including opposed contact faces substantially coextensive with the opposed apertures, means for moving said contact faces of said plungers into mutually opposed pressing relationship with said sheets to express air which may be entrapped in the captured areas outlined by said opposed apertures in said faces, means for retracting said plungers, means for introducing, under pressure, within each of the captured areas outlined by each pair of opposed areas, a measured amount of fluid under pressure whereby the captured areas of said opposed sheets are inflated into opposed semi-globular areas entirely filled with said fluid, hollow die punches coaxial with said plungers and individual to each pair of opposed apertures, and means for forcing said die punches toward each other through said apertures into abutting face-to-face relationship on opposite sides of said sheets, to seal together peripheral zones of each of said captured areas and substantially sever them from contiguous portions of said sheets to thereby form sealed globular capsules entirely filled with said fluid, and ejector rods individual to each aperture in one of said faces and means for causing said ejector rods to protrude through the aperture in one of said faces removed from face-to-face relationship to eject capsules from either of said cylinders in which they may have become entrapped.

12. A capsule making machine including means having flat faces and opposed apertures opening therein for capturing selected areas of a pair of superposed sheets of plastic, said means holding said sheets in intimate face-to-face contact around said areas, air expelling means for momentarily pressing said sheets together in said areas to express air which may be entrapped between said sheets in said areas, said air-expelling means including opposed plungers in said opposed apertures having contact faces substantially coextensive with said apertures and movable into mutually opposed pressing relationship with said sheets when the latter are held in face-to-face contact around said areas, a tubular supply nozzle adjacent each of said captured areas arranged so as not to substantially disturb the face-to-face contact of said sheets about said captured areas, fluid supply means connected to said nozzle for introducing under pressure a measured amount of fluid between said sheets in said captured areas whereby said areas are each inflated into opposed semi-globular forms filled with said fluid, and means for applying localized sealing pressures in narrow ring-like zones individually within and surrounding said captured areas to seal each pair of semi-globular forms together entirely around the periphery thereof.

13. A capsule making machine including means having flat faces and opposed apertures opening therein for coupling selected areas of a pair of superposed sheets of plastic, said means holding said sheets in intimate face-to-face contact around said areas, air expelling means for momentarily pressing said sheets together in said areas to express air which may be entrapped between said sheets in said areas, said air-expelling means including opposed plungers in said opposed apertures having contact faces substantially coextensive with said apertures and movable into mutually opposed pressing relationship with said sheets when the latter are held in face-to-face contact around said areas, a number of tubular fluid supply nozzles mounted adjacent each of said captured areas and arranged so as not to substantially disturb the face-to-face contact of said sheets about said captured areas, fluid supply means connected to said nozzles for introducing under pressure a measured amount of fluid between said sheets in said captured areas whereby said areas are each inflated into opposed semi-globular forms filled with said fluid, and means for applying localized sealing pressures in narrow ring-like zones individually within and surrounding said captured areas to seal each pair of semi-globular forms together entirely around the periphery thereof.

14. A capsule making machine including means having flat faces and opposed apertures opening therein for capturing selected areas of a pair of superposed sheets of plastic, said means holding said sheets in intimate face-to-face contact around said areas, a tubular fluid supply nozzle mounted adjacent each of said captured areas, said means being provided with a relief channel whereby said nozzle does not disturb the face-to-face contact of said sheets about said captured areas except in the location of said nozzle, air expelling means for momentarily pressing said sheets together in said areas to express air which may be entrapped between said sheets in said areas, said air-expelling means including opposed plungers in said opposed apertures having contact faces substantially coextensive with said apertures and movable into mutually opposed pressing relationship with said sheets when the latter are held in face-to-face contact around said areas, fluid supply means connected to said nozzles for introducing under pressure a measured amount of fluid between said sheets in said captured areas whereby said areas are each inflated into opposed semi-globular forms filled with said fluid, and means for applying localized sealing pressures in narrow ring-like zones individually within and surrounding said captured areas to seal each pair of semi-globular forms together entirely around the periphery thereof.

15. A capsule making machine including means having flat faces and opposed apertures opening therein for capturing selected areas of a pair of superposed sheets of plastic, said means holding said sheets in intimate face-to-face contact around said areas, air expelling means for momentarily pressing said sheets together in said areas to express air which may be entrapped between said sheets in said areas, said air-expelling means including opposed plungers in said opposed apertures having contact faces substantially coextensive with said apertures and movable into mutually opposed pressing relationship with said sheets when the latter are held in face-to-face contact around said areas, means supporting tubular supply nozzles adjacent each of said captured areas without disturbing the face-to-face contact of said sheets about said captured areas, fluid supply means connected to said nozzles for introducing under pressure a measured amount of fluid between said sheets in said captured areas whereby said areas are each inflated into opposed semi-globular forms entirely filled with said fluid and means for applying localized sealing pressures in narrow ring-like zones individually within and surrounding said captured areas to seal each pair of semi-globular forms together entirely around the periphery thereof, said last mentioned means also serving to substantially sever the sealed together areas from the remainder of said sheets.

16. A capsule making machine including means having flat faces and opposed apertures opening therein for capturing selected areas of a pair of superposed sheets of plastic, said means holding said sheets in intimate face-to-face contact around said areas, air expelling means for momentarily pressing said sheets together in said areas to express air which may be entrapped between said sheets in said areas, said air-expelling means including opposed plungers in said opposed apertures having contact faces substantially coextensive with said apertures and movable into mutually opposed pressing relationship with said sheets when the latter are held in face-to-face contact around said areas, means supporting tubular supply nozzles adjacent each of said captured areas without disturbing the face-to-face contact of said sheets about said captured areas, fluid supply means connected to said nozzles for introducing under pressure a measured amount of fluid between said sheets in said captured areas whereby said areas are each inflated into opposed semi-globular forms entirely filled with said fluid, means for applying localized sealing pressures in narrow ring-like zones individually within and surrounding said captured areas to seal each pair of semi-globular forms together entirely around the periphery thereof, said means for capturing selected areas comprising a pair of hollow cylinders having polygonal outer surfaces and a number of apertures aligned along each of the faces of said polygonal outer surfaces.

17. A capsule making machine including means for capturing selected areas of a pair of superposed sheets of plastic, said means holding said sheets in intimate face-to-face contact around said areas, means for momentarily pressing said sheets together in said areas to express air which may be entrapped between said sheets in said areas, means inserting tubular supply nozzles into each of said captured areas without disturbing the face-to-face contact of said sheets about said captured areas, fluid supply means connected to said nozzles for introducing under pressure a measured amount of fluid between said sheets in said captured areas whereby said areas are each inflated into opposed semi-globular forms entirely filled with said fluid, means for applying localized sealing pressures in narrow ring-like zones immediately within and surrounding said captured areas to seal each pair of semi-globular forms together entirely around the periphery thereof, said last mentioned means also serving to substantially sever the sealed together areas from the remainder of said sheets, said means for capturing selected areas comprising a pair of hollow cylinders having polygonal outer surfaces and a number of apertures aligned along each of the faces of said polygonal outer surfaces, said cylinders being mounted for rotation about closely adjacent parallel axes and means for shifting said axes laterally to bring the flat faces of said cylinders into contact.

18. A capsule making machine including means having flat faces and opposed apertures opening therein for capturing selected areas of a pair of superposed sheets of plastic, said means holding said sheets in intimate face-to-face contact around said areas, air expelling means for momentarily pressing said sheets together in said areas to express air which may be entrapped between said sheets in said areas, said air-expelling means including opposed plungers in said opposed apertures having contact faces substantially coextensive with said apertures and movable into mutually opposed pressing relationship with said sheets when the latter are held in face-to-face contact around said areas, means inserting tubular supply nozzles into each of said captured areas without disturbing the face-to-face contact of said sheets about said captured areas, fluid supply means connected to said nozzles for introducing under pressure a measured amount of fluid between said sheets in said captured areas whereby said areas are each inflated into opposed semi-globular forms entirely filled with said fluid, means for applying localized sealing pressures in narrow ring-like zones immediately within and surrounding said captured areas to seal each pair of semi-globular forms together entirely around the periphery thereof, said last mentioned means also serving to substantially sever the sealed together areas from the remainder of said sheets, said means for capturing selected areas comprising a pair of hollow cylinders having polygonal outer surfaces and a number of apertures aligned along each of the faces of said polygonal outer surfaces.

19. A capsule making machine including means having flat faces and opposed apertures opening therein for capturing selected areas of a pair of superposed sheets of plastic, said means holding said sheets in intimate face-to-face contact around said areas, air expelling means for momentarily pressing said sheets together in said areas to express air which may be entrapped between said sheets in said areas, said air-expelling means including opposed plungers in said opposed apertures having contact faces substantially coextensive with said apertures and movable into mutually opposed pressing relationship with said sheets when the latter are held in face-to-face contact around said areas, means inserting tubular supply nozzles into each of said captured areas without disturbing the face-to-face contact of said sheets about said captured areas, fluid supply means connected to said nozzles for introducing under pressure a measured amount of fluid between said sheets in said captured areas whereby said areas are each inflated into opposed semiglobular forms entirely filled with said fluid, means for applying localized sealing pressures in narrow ring-like zones immediately within and surrounding said captured areas to seal each pair of semi-globular forms together entirely around the periphery thereof, said last mentioned means also serving to substantially sever the sealed together areas from the remainder of said sheets, said means for capturing selected areas comprising a pair of hollow cylinders having polygonal outer surfaces and a number of apertures aligned along each of the faces of said polygonal outer surfaces, said cylinders being mounted for rotation about closely adjacent parallel axes.

20. A capsule making machine including means for capturing selected areas of a pair of superposed sheets of plastic, said means holding said sheets in intimate face-to-face contact around said areas, means for introducing, under pressure, measured amounts of a filling material between said sheets in said captured areas whereby said areas are each inflated into opposed semi-globular forms filled with said material and means for applying localized sealing pressures in narrow ring-like zones individually within and surrounding said captured areas to seal each pair of semi-globular forms together entirely around the periphery thereof, said first mentioned means comprising a pair of parallel multi-facetted rotatable polygonal cylinders having apertures in the flat faces thereof to define said areas, means for intermittently rotating said cylinders to feed said sheets therebetween and means for laterally moving said cylinders with respect to one another to maintain a uniform spacing therebetween in a line joining the axes of said cylinders whereby uniform driving pressures on said sheets is maintained.

21. A machine for forming plastic capsules filled with a hydraulic fluid comprising means for pressing a pair of superposed sheets of plastic together, said means including apertures defining captured areas of said sheets, means for pressing said captured areas to express air, the pressing means including opposed plungers movably mounted in said apertures and having contact faces substantially coextensive with said apertures and movable into mutually opposed pressing relationship with said sheets, means for inserting, under pressure, a measured amount of said fluid between said sheets in said captured areas to cause the captured areas of said sheets to be inflated into opposed semi-globular forms together entirely filled with said fluid, means for applying localized sealing pressures in narrow ring-like zones immediately within the perimeter of said captured areas and surrounding said semi-globular forms to seal said semi-globular forms together entirely around the perimeter thereof and means for freeing the globular capsules so formed from the remainder of said sheet.

22. A capsule making machine including means for holding plastic sheets in intimate face-to-face contact, said means including a number of spaced apertures defining captured areas in said sheets, means for momentarily pressing said sheets together in said areas to express air which may be entrapped between said sheets in said areas, the pressing means including opposed plunger movably mounted in said apertures and having contact faces substantially coextensive with said apertures and movable into mutually opposed pressing relationship with said sheets, fluid supply means for introducing under pressure a measured amount of fluid between said sheets in said captured areas whereby said areas are each inflated into opposed semi-globular forms filled with said fluid, and means for applying localized sealing pressures in narrow ring-like zones individually within said captured areas and surrounding said semi-globular forms to seal each pair of semi-globular forms together entirely around the periphery thereof.

23. A capsule making machine including means for holding a pair of superposed sheets of plastic in intimate face-to-face contact over extended portions thereof, said means including a number of separated holes defining captured areas, means for expressing air from between said sheets in said captured areas, means for introducing under pressure, measured amounts of a filling material between such sheets within said captured areas whereby said areas are each inflated into opposed semi-globular forms filled with said material and means for applying localized sealing pressures in narrow ring-like zones individually within said captured areas and surrounding said semi-globular forms to seal each pair of semi-globular forms together entirely around the periphery thereof, said first-mentioned means comprising a pair of parallel rotatable polygonal cylinders having flat faces with a number of apertures therein to define said areas, means for intermittently rotating said cylinders to feed said sheets therebetween and means for laterally moving said cylinders with respect to one another to maintain a uniform spacing therebetween in a line joining the axes of said cylinders whereby uniform driving pressure on said sheets is maintained.

24. In a machine for making capsules by introducing a filling material under pressure into selected areas between a pair of superposed sheets of plastic, means for feeding said sheets and isolating said selected areas comprising a pair of multi-faceted cylinders each rotatable about a longitudinal axis, each of said cylinders having flat faces parallel to said axis and having a number of capsule-forming apertures therein, a bearing block upon which each of said cylinders rotates, said bearing blocks each being mounted for oscillation on an axis spaced from the axis of its associated cylinder, means for indexing said cylinders about their axes and means for oscillating said blocks to and fro as said cylinders are indexed and in timed relation thereto whereby the spacing between said faces remains constant as said cylinders are indexed.

25. In a machine for making capsules by introducing a filling material under pressure into selected areas between a pair of superposed sheets of plastic, means for feeding said sheets and isolating said selected areas comprising a pair of multi-faceted cylinders each rotatable about a longitudinal axis, each of said cylinders having flat faces parallel to said axis and having a number of capsule-forming apertures therein, a bearing block upon which each of said cylinders rotates, said bearing blocks each being mounted for oscillation on an axis spaced from the axis of its associated cylinder, means for indexing said cylinders about their axes and means for oscillating said blocks to and fro as said cylinders are indexed and in timed relation thereto whereby the spacing between said faces remains constant as said cylinders are indexed, said bearing blocks having a number of radial bores in alignment with said apertures of abutting faces of said cylinders, and means within said bores for expressing air imprisoned between said sheets of plastic in said selected areas.

26. In a machine for making capsules by introducing a filling material under pressure into selected areas between a pair of superposed sheets of plastic, means for feeding said sheets and isolating said selected areas comprising a multi-faceted cylinder rotatable about a longitudinal axis, said cylinder having flat faces parallel to said axis and having a number of capsule-forming apertures therein, a bearing block upon which said cylinder rotates, said bearing block being mounted for oscillation on an axis spaced from the axis of said cylinder, means for indexing said cylinder about its axis and means for oscillating said block to and fro as said cylinder is indexed and in timed relation thereto.

27. In a machine for making capsules by introducing a filling material under pressure into selected areas between a pair of superposed sheets of plastic, means for feeding said sheets and isolating said selected areas comprising a multi-faceted cylinder rotatable about a longitudinal axis, said cylinder having flat faces parallel to said axis and having a number of capsule-forming apertures therein, a bearing block upon which said cylinder rotates, said bearing block being mounted for oscillation on an axis spaced from the axis of said cylinder, means for indexing said cylinder about its axis and means for oscillating said block to and fro as said cylinder is indexed and in timed relation thereto, said bearing block having a number of radial bores in alignment with said apertures at the end of each indexing operation, a co-axially arranged plunger and hollow die punch within each of said bores, and means for selectively extending said plungers and dies through said apertures while said cylinder is stationary.

28. A capsule making machine including means for feeding a pair of superposed sheets of plastic in face-to-face contact through a capsule forming and filling station where said sheets around selected areas thereof are held in contact with one another, means for introducing, under pressure, measured amounts of filling material between said sheets in said areas, means for freeing the capsules so formed from the remainder of said sheets, said filling station being characterized in that it includes a pair of parallel multi-faceted elongated polygonal cylinders each rotatable about a longitudinal axis and having apertures in the faces thereof to define such selected areas, said cylinders being further oscillatable during rotation about axes parallel to but displaced from their axes of rotation whereby a uniform distance between the faces of said cylinders is maintained.

References Cited in the file of this patent

UNITED STATES PATENTS

| | | |
|---|---|---|
| 1,669,976 | De Leeuw | May 15, 1928 |
| 1,970,396 | Scherer | Aug. 14, 1934 |
| 2,199,210 | Scherer | Apr. 30, 1940 |
| 2,279,505 | Ravenscroft | Apr. 14, 1942 |
| 2,288,327 | Scherer | June 30, 1942 |
| 2,313,269 | Sadtler | Mar. 9, 1943 |
| 2,657,510 | Lewis | Nov. 3, 1953 |
| 2,775,084 | Stirn et al. | Dec. 25, 1956 |
| 2,840,961 | Karpowitz | July 1, 1958 |
| 2,976,654 | Vogt | Mar. 28, 1961 |